US012387267B1

(12) United States Patent
Guerrero et al.

(10) Patent No.: US 12,387,267 B1
(45) Date of Patent: *Aug. 12, 2025

(54) SYSTEMS AND METHODS FOR DEVELOPING AN AUTOMATED LIFE PLANNER

(71) Applicant: United Services Automobile Association (USAA), San Antonio, TX (US)

(72) Inventors: Elizabeth Guerrero, San Antonio, TX (US); Chase Nicholas Borden, Helotes, TX (US); Randal Lane Schnedler, San Antonio, TX (US); Nitin Obhrai, San Antonio, TX (US); Natalya Lohinova Jeffords, San Antonio, TX (US); William H. Bloom, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,598

(22) Filed: Jul. 21, 2022

Related U.S. Application Data

(63) Continuation of application No. 17/237,043, filed on Apr. 21, 2021, now Pat. No. 11,430,068, which is a continuation of application No. 15/416,278, filed on Jan. 26, 2017, now Pat. No. 11,017,474.

(60) Provisional application No. 62/288,653, filed on Jan. 29, 2016.

(51) Int. Cl.
*G06Q 40/06* (2012.01)
*G06F 3/04817* (2022.01)
*G06F 3/0482* (2013.01)
*G06F 16/2455* (2019.01)

(52) U.S. Cl.
CPC ......... *G06Q 40/06* (2013.01); *G06F 3/04817* (2013.01); *G06F 3/0482* (2013.01); *G06F 16/2455* (2019.01)

(58) Field of Classification Search
CPC .................................................. G06Q 40/06
See application file for complete search history.

(56) References Cited

U.S. PATENT DOCUMENTS

| 6,064,984 A | 5/2000 | Ferguson et al. |
| 6,430,542 B1 | 8/2002 | Moran |
| 8,934,040 B2 | 1/2015 | Okazawa |

(Continued)

OTHER PUBLICATIONS

Gotoh, in "Interaction between financial risk measures and machine learning methods," from Computational Management and Science (2014), (Year: 2014).*

(Continued)

*Primary Examiner* — Mike Anderson
*Assistant Examiner* — Brandon M Duck
(74) *Attorney, Agent, or Firm* — Perkins Coie LLP

(57) ABSTRACT

Methods and systems described in this disclosure are directed at developing a life planner for a user based on data collected from various data sources. The life plan is displayed using a timeline that includes events generated from the collected data. As additional data is received, the timeline is updated to reflect the changes or additions to the data. In some embodiments, the life plan includes recommendations and predictions pertaining to a financial plan for the user based on his or her expenses and income.

20 Claims, 20 Drawing Sheets

(56) References Cited

U.S. PATENT DOCUMENTS

| | | | | |
|---|---|---|---|---|
| 9,460,123 | B1* | 10/2016 | Strutt | G06F 17/30 |
| 10,943,298 | B1* | 3/2021 | White | G06Q 40/06 |
| 11,017,474 | B1 | 5/2021 | Guerrero et al. | |
| 2007/0027736 | A1 | 2/2007 | Reynolds et al. | |
| 2009/0276368 | A1* | 11/2009 | Marton | G06Q 40/00 |
| 2014/0136381 | A1 | 5/2014 | Joseph et al. | |
| 2015/0073952 | A1 | 3/2015 | Ventura et al. | |
| 2016/0335724 | A1 | 11/2016 | Mak | |
| 2017/0076754 | A1 | 3/2017 | Pello | |

OTHER PUBLICATIONS

Gilbey, "Intelliflo's Intelligent Office welcomes Voyant integration," Intelliflo.com, Apr. 2015.

Chitra, "An Approach for Canny Edge Detection Algorithm on Face Recognition," International Journal of Science and Research, vol. 4, Issue 11, Nov. 2015.

* cited by examiner

SYSTEMS AND METHODS FOR DEVELOPING AN AUTOMATED LIFE PLANNER

CROSS-REFERENCE TO RELATED APPLICATIONS

This application is a continuation of U.S. patent application Ser. No. 17/237,043 filed Apr. 21, 2021, now allowed, which is a continuation of U.S. patent application Ser. No. 15/416,278 filed Jan. 26, 2017, issued as U.S. Pat. No. 11,017,474 on May 25, 2021, which is a non-provisional of and claims priority to U.S. Provisional Application No. 62/288,653, filed Jan. 29, 2016, entitled "SYSTEMS AND METHODS FOR DEVELOPING AN AUTOMATED LIFE PLANNER," all of which are hereby incorporated by reference in their entirety for all purposes.

TECHNICAL FIELD

Various embodiments of the present disclosure relate to methods and systems for developing a timeline based on data collected from various data sources.

BACKGROUND

Typically, financial planning involves a human financial planner. But a human planner is limited in his or her ability to consider and display the impacts of possible current and future events in the personal life of a user for developing the user's financial plan.

BRIEF DESCRIPTION OF THE DRAWINGS

Embodiments of the present disclosure will be described and explained through the use of the accompanying drawings in which:

FIGS. 7-12 illustrate example GUIs depicting timelines and life events in accordance with various embodiments of the present disclosure;

DETAILED DESCRIPTION

Figure 1:
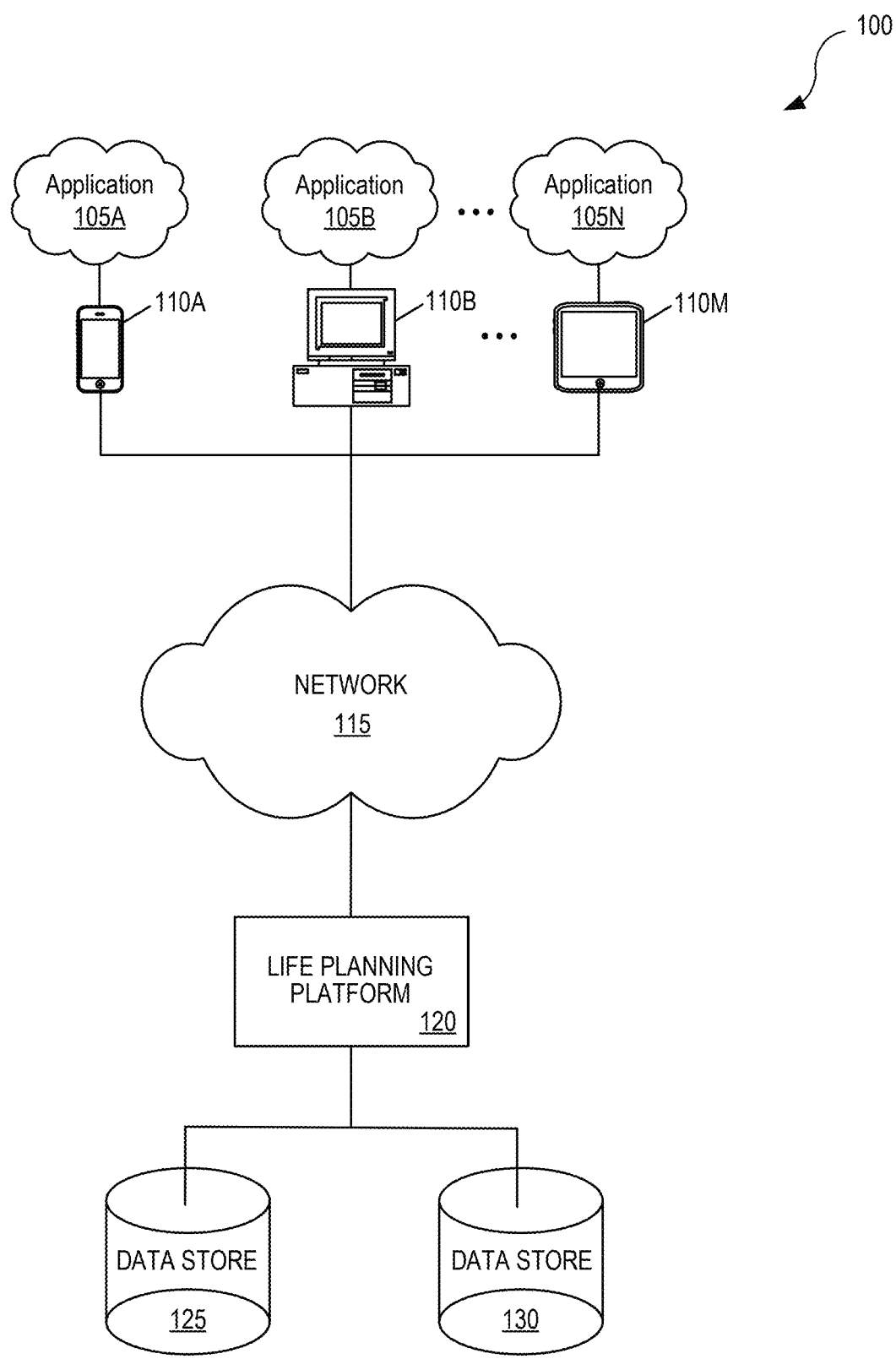
FIG. 1 illustrates an example of a network-based operating environment in accordance with various embodiments of the present disclosure.

Various embodiments of the present disclosure generally relate to life planning, including financial planning. More specifically, various embodiments of the present disclosure relate to methods and systems for developing a timeline based on data collected from a wide variety of data sources and providing recommendations relating to events on the timeline.

Typically, financial planning is performed by a human financial planner who reviews a consumer's finances, holdings, liquid and solid assets, and liabilities and then creates a plan for that consumer. In this approach, however, events related to a consumer's personal life such as having a baby, losing a job, moving to a new city, and losing an income source after the death of a spouse are generally not considered or visually displayed for the consumer on a timeline. Since a consumer's life events impact the consumer's financial plan and recommended actions, there is a need to design a method of financial planning that considers such events and displays the events on a timeline.

Methods and systems disclosed herein allow users (i.e., consumers) and/or insurance companies to develop a custom financial outlook or plan using visualization techniques of displaying a timeline on a GUI. The timeline can show events, particularly those events that impact a user's finances, and may include indications of funds needed for the event and the user's progress toward obtaining those funds. For example, a planned or target retirement date may be positioned on the timeline. In some embodiments, the timeline may further show the user's predicted financial well-being over time based on predicted income and expenses.

Events can be determined in many different ways and from many different sources. For example, personal life events can be provided by a user interacting with the system (e.g., the user enters text, submits an image, or sends a message (e.g., text, email)). Personal life events can include events such as having a baby, getting married, moving from one residence to another, sending a child to college. The user may also submit an actual or estimated date of a personal life event. Such events are factored into the timeline and displayed on a timeline, providing a visual of the user's life events. In some embodiments, the user's financial well-being (e.g., net worth, cash flow, credit score) can also be displayed.

In another example, a user can submit, post on social media, or otherwise provide an image relating to a current or a possible future event in the user's life. The disclosed system can scan the image to extract life event information and determine the event for the user, and then provide customized advice relating to that event. In a specific example, a photograph and/or other collaborating information (e.g., purchase of diapers) may indicate that the user has had a baby. Thus, the system can recommend updating the user's health insurance policy to add a dependent. The system can further recommend a college savings goal for the baby.

In some embodiments, the system can receive images indicating one or more events associated with a user from external sources such as social media networks, public libraries, publicly available records, or websites. Moreover, the system can apply image processing methodologies to extract one or more characteristics (e.g., facial recognition, event recognition) associated with the images. The images can convey life events associated with the user. For example, a user can upload an image showing a life event such as a birth in the family, a graduation of a family member, or the admission of the user or a family member to a college or a university. The system can compare the one or more characteristics of these images against the characteristics of a user's facial image (e.g., provided during a registration process) to identify the user's face from the life event images. Upon identifying the user, the system can determine life events associated with the user and can provide recommendations (e.g., changes to one or more insurance policies) based on the life events. In some embodiments, upon identifying the user, the system generates visual indicia corresponding to the life events captured in the images, with such visual indicia (or, the life events) being added to the displayed timeline of the user.

In some embodiments, the events are displayed on a timeline. The events can be a first type or a second type. The first type of event can be an event that has a single date associated with it, whereas the second type of event can span multiple dates. The system can determine whether the date is a first type of event or a second type of event. When an event is added to the timeline, the event may change a location of a second event such that the second event shifts dates on the timeline or adjusts in the window so that all events are visible. Adding an additional event may also cause changes to the timeline (e.g., decreasing the user's financial health upon occurrence of the event), which may trigger recommendations such as moving events to a different time (if possible) or other financial advice.

Also, in some embodiments, an indication of financial health can be added to a vertical axis of the timeline, and a financial health indication line drawn over the timeline can illustrate the user's past, current and predicted financial health. Thus, a user can view associated expenses on the timeline and view how the events are predicted to affect the user's finances (both currently and in the future) as the timeline is regenerated to account for the event. Thus, the event may result in a movement of the timeline down (or up) after the event is predicted to occur.

Additionally, recommendations and predictions may be made to assist the user in dealing with the life events and upcoming expenses and income. Such recommendations may be made in response to the addition of a life event. For example, if an event that is predicted to occur in a few months is predicted to have a large impact on the user's financial well-being, a recommendation to save additional funds or move another event may be made. Such recommendations may be presented on the user interface in text and/or by moving the event on the timeline in accordance with the recommendation.

As used herein, the term "user" is not limited to private individuals but can include small- and large-business owners. More generally, the term "user" includes any person or entity that uses the system.

In some embodiments, the disclosed system gathers data from third-party sources relating to a user. Examples of third-party sources include social media systems, credit reporting organizations, banks, financial institutions, publicly available land zoning data, and the like. For instance, the disclosed system can mine publicly available data to determine that a user is moving from one residence to another.

In the following description, for the purposes of explanation, numerous specific details are set forth in order to provide a thorough understanding of embodiments of the present disclosure. However, it will be apparent to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random-access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices 110A-110M can include mechanisms for receiving and sending traffic by connecting through network 115 to life planning platform 120 and data stores 125 and 130.

In some embodiments, computing devices 110A-110M can retrieve or submit information to life planning platform 120 and run one or more applications 105A-105N with customized content retrieved by life planning platform 120 from data stores 125 and 130. For example, computing devices 110A-110M can execute a browser application or a customized client to enable interaction among the computing devices 110A-110M, life planning platform 120, and data stores 125 and 130. In some embodiments, users can provide personal and financial information to life planning platform 120 via computing devices 110A-110M (e.g., via a web portal or a mobile application program). Users can also submit images and photographs of various significant events in their lives.

Network 115 can be any combination of local area and/or wide area networks, using wired and/or wireless communication systems. Network 115 can be or could use any one or more protocols/technologies, such as Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Life planning platform 120 can be running on one or more servers and can be used to receive data from one or more sources, including data from users and financial institutions of users; to create for users financial plans that include financial planning timelines; to provide recommendations and predictions; to store user profiles and/or users' financial data in data stores 125 and 130; and/or to perform other activities. In some embodiments, life planning platform 120 includes various data processing and analytic tools that allow life planning platform 120 to recognize events and develop the financial timeline. In some embodiments, life planning platform 120 is a server.

Data stores 125 and 130 can be used to manage storage and access to user data, such as user profiles, images received from users during a registration process, users' financial and personal data, data received from third parties, data received from users' banks and financial institutions, data received from credit agencies, and other information. Information provided by users can also be stored in data stores 125 and 130. Data stores 125 and 130 may be data repositories of a set of integrated objects that are modeled using classes defined in database schemas. Data stores 125 and 130 may further include flat files that can store data. Life planning platform 120 and/or other servers may collect and/or access data from the data stores 125 and 130.

Figure 2:
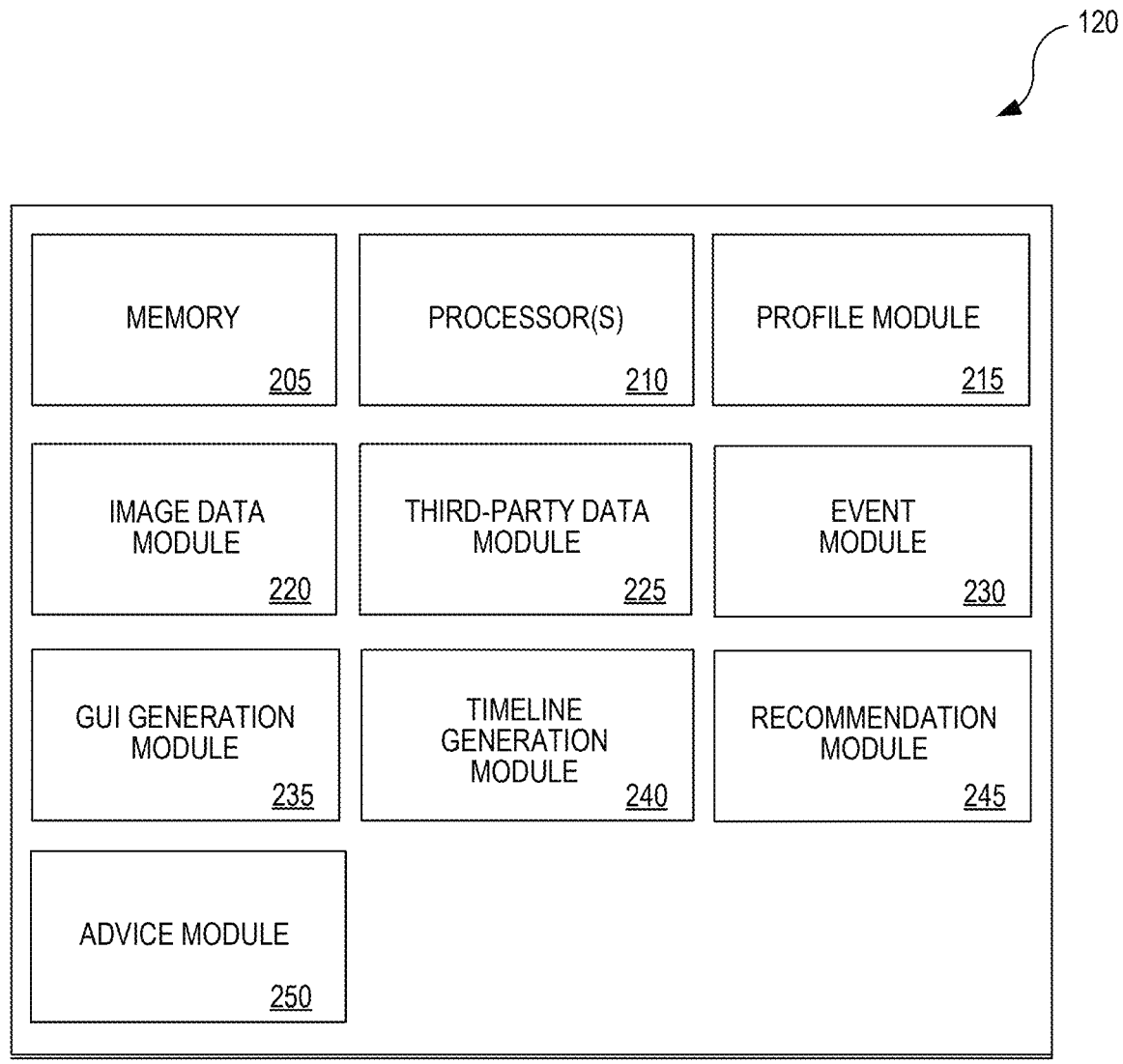
FIG. 2 illustrates various components of a life planning platform that may be used in accordance with various embodiments of the present disclosure.

FIG. 2 illustrates a set of components within life planning platform 120 according to one or more embodiments of the present disclosure. According to the embodiments shown in FIG. 2, life planning platform 120 can include memory 205, one or more processors 210, profile module 215, image data module 220, third-party data module 225, event module 230, GUI generation module 235, timeline generation module 240, recommendation module 245, and advice module 250. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house some or all of the instructions needed to execute the functionality of profile module 215, image data module 220, third-party data module 225, event module 230, timeline generation module 240, recommendation module 245, and advice module 250. Generally, memory 205 can include any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random-access memory, memory storage devices, optical memory devices, magnetic media, floppy disks, magnetic tapes, hard drives, single in-line memory modules (SIMMs), dual in-line memory modules (DIMMs), small outline dual in-line memory modules (SODIMMs), synchronous dynamic random-access memory (SDRAM), Rambus dynamic random-access memory (RDRAM), double data rate random-access memory (DDR RAM), EPROMS, EEPROMs, compact discs, DVDs, and/or the like. In accordance with some embodiments, memory 205 may include one or more disk drives and/or flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Profile module 215 can create for a user of life planning platform 120 a profile that reflects the personal and financial information of the user. The profile may include information such as the user's personal data, insurance policy data, insurance data, bank/financial institution data, credit card/debit card data, and data relating to the user's monthly utilities. Personal data of a user may include the user's name, an address, a phone number, an email address, and a class of the user identifying whether the user is a residential user or a business owner. Profiles can also include financial information relating to one or more monthly utility bills of the user, mortgage payments for a property or a vehicle, or credit card bills.

Figure 19:
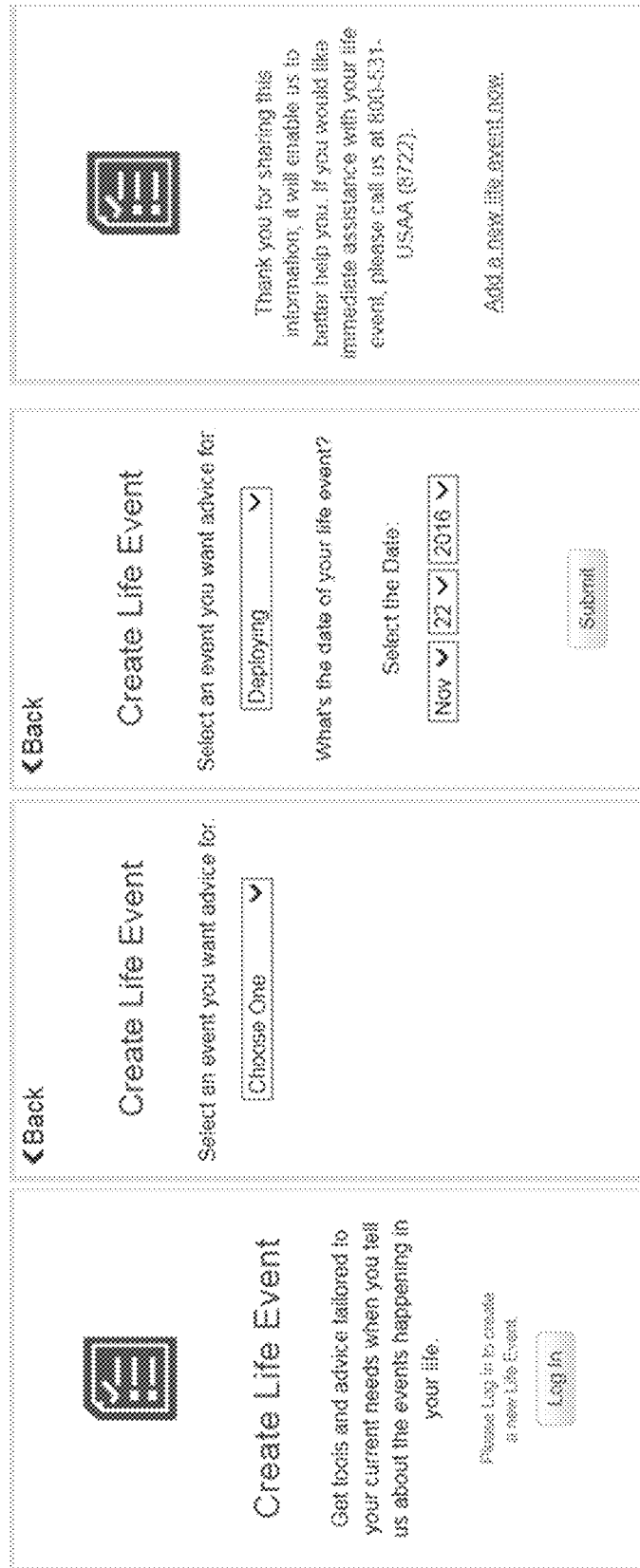

In some embodiments, the user can access an advice center which allows the user to personalize and customize data associated with the user. For example, the user can select topics the user is interested in (e.g., buying and selling a vehicle, maintaining and protecting a vehicle, buying and selling a home, renting a home, maintaining and protecting a home, refinancing a mortgage, managing rental property, saving and budgeting, debt and credit, financial setbacks, understanding investments, getting started in retirement, growing retirement, living in retirement, estate planning, joining the military, deployment, PCS, leaving the military, getting married, becoming a parent, parenting, young adults, getting a divorce, loss of a loved one, life insurance, health insurance, changing jobs, education and training). In some embodiments, the topics can be pre-selected based on what is known about the user and the user can edit such selections. Once the topics are selected, advice module 250 can display advice and content relating to the topics. In some embodiments, the user can create life events or provide information regarding life events to an application, such as shown in FIG. 19. The user can select an event and a date of the event.

In some embodiments, facial recognition can be used to determine events. During a registration process, a user can provide an image showing his or her face. Such image can be processed using image processing methodologies to extract one or more characteristics associated with the image. The one or more characteristics can be used by facial recognition software to identify the user's face in other images. These images can be received from external sources such as social media networks, public libraries, publicly available records, websites, or any other information source. These images can, for example, be conveyed by third-party data module 225. Accordingly, profile module 215 can store images of people, places, or events and/or the one or more characteristics of these people, places, or events such as facial features (e.g., distance between eyes). The profile module 215 can query a networked database to retrieve profile information of users. Such profile information can be stored in the "cloud" or physically coupled to the profile module 215.

Image data module 220 can scan images of photographs or other documents submitted by users to extract life event information embedded in such images. In some embodiments, image data module 220 can extract information identifying changes to life events of a user based on scanning electronic documents. For example, image data module 220 can extract information identifying a life event from documents such as a user's marriage certificate, birth certificate indicating a birth in the user's family, death certificate of a death in the family, or any other electronic document received at life planning platform 120. In another example, image data module 220 can extract one or more characteristics associated with the image using image processing methodologies to identify a user and determine an event.

Third-party data module 225 facilitates information to be collected from one or more third-party information sources. Examples of third-party sources include social media networks, utility companies, credit reporting organizations, banks, financial institutions, and publicly available land zoning data. For example, third-party data module 225 can mine publicly available data to determine that a user is moving from one residence to another. Such information can be used to add the event to the timeline, provide advice, and/or change the user's financial plan. For example, if a user moves from Atlanta to New York City, the event can be added to the user's timeline and, in some embodiments, the user's financial plan can change due to the higher cost of living in New York City. A change in a user's financial plan can be demonstrated with a change in the timeline and/or in the recommendations for a user. For example, if a user's income does not increase, a move from Atlanta to New York City will likely result in the user saving less money.

In some scenarios, third-party data module 225 can receive or collect images uploaded by a user to his or her social media networks. For example, a user can upload an image showing life events such as a birth in the family, a graduation of a family member, the admission of the user or a family member to a college or a university, or any other life event. Third-party data module 225 can query information sources via an API call or other electronic mechanism to receive a response from the information sources. In some embodiments, third-party data module 225 can continuously monitor and/or scrape information such as posts, blogs, comments, texts, images, etc., from a user's social media page to collect life event information of the user. In some instances, such information can be provided by a user's friends and/or social media network connections.

Event module 230 generates information relating to events. Events can be related to a user's personal life such as having a baby, losing a job, losing an income source after the death of a spouse, obtaining a degree and getting a job in a related field, paying off a vehicle, and moving to a different location.

In some embodiments, the user inputs (e.g., via user-selectable controls displayed on a GUI) information relating to the events (e.g., such as a date of occurrence or a starting date and an ending date, as applicable), while in other embodiments, the events are automatically added to an event timeline (e.g., events extracted from scanning images retrieved from a user's social media profile, events determined from the purchase of a product). Such events can change the financial plan developed by life planning platform 120 and the timeline generated by timeline generation module 240. For example, having a baby can introduce new monthly expenses that affect the financial well-being of the user. The life planning platform 120 can factor the new expenses into the user's plan and decrease the financial well-being measurement of the user accordingly, which can be displayed using the timeline generation module 240.

Figure 11:

When events are added to the timeline, recommendation module 245 can provide recommendations to the user. The recommendations can be displayed on a user interface below the timeline. In some embodiments, the recommendations can recommend a change to the financial plan, resulting in the timeline moving up or down with the user's recalculated financial health and/or moving an event further or nearer in time. Advice may also be provided to the user based on the user's events. Examples of advice topics are shown in FIG. 11 (e.g., 529 college savings plans (1102), core advice (1104), leaving the military (1106), planning for retirement (1108), managing debt (1110), financial score card evaluation (1112), buying a home (1114).

Figure 7:
Figure 8:
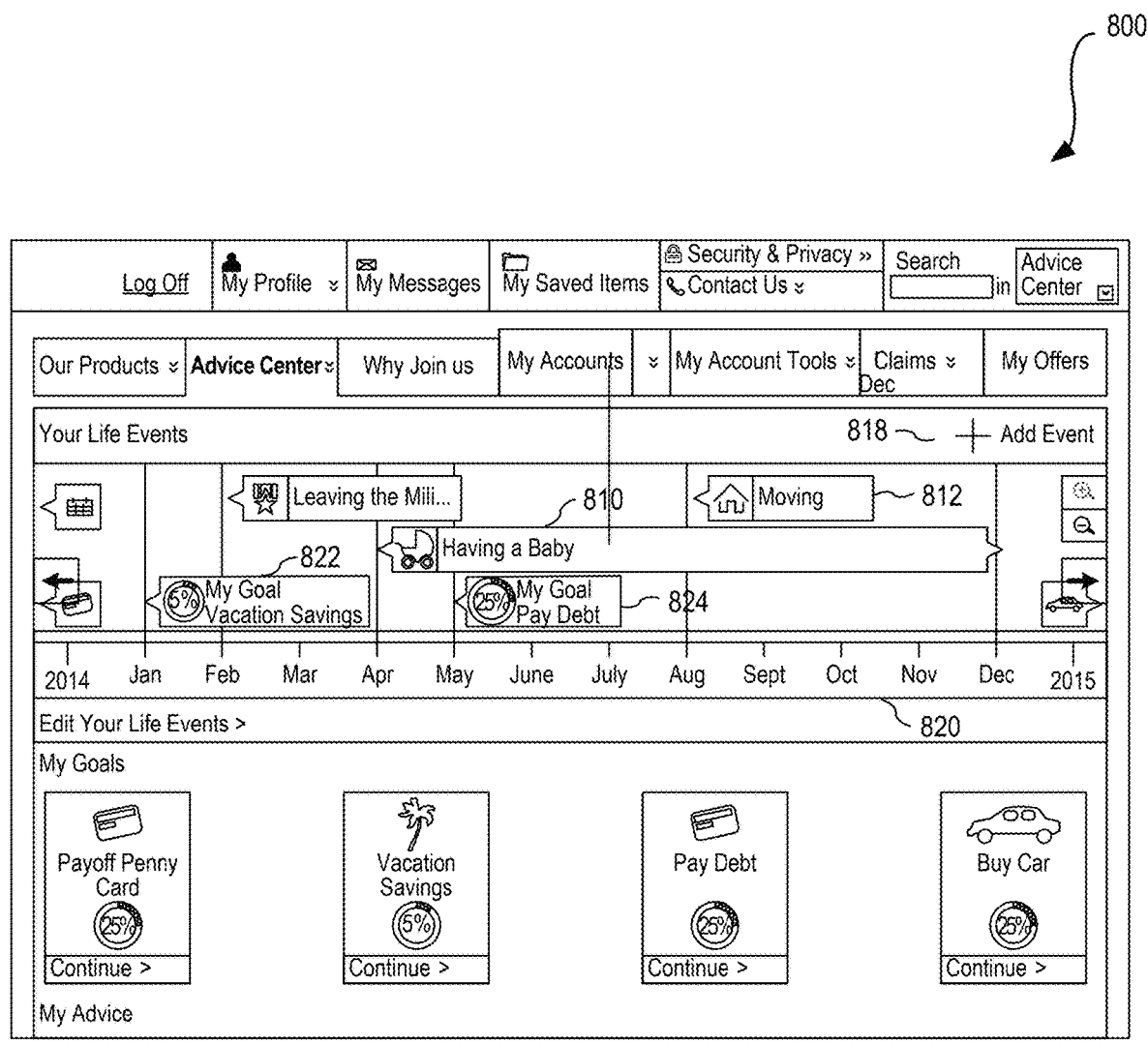

In embodiments of the present disclosure, a received event can be classified as a first event type or a second event type. A first type of event is an event that has a date of occurrence and can be indicated as a point on a timeline. For example, a user's wedding date and the birth of a child can be considered a first type of event. A second type of event is an event that has a start date of occurrence and an end date of occurrence. Such events are cumulative and extend in time, and are accordingly indicated as horizontal bars on a timeline. Examples of a second event type include preparing for a baby, planning a wedding, paying off a credit card bill over time, accumulating savings for a vacation, etc. In FIG. 7, examples of second event types, such as leaving the military 730, having a baby 732, moving residences 734, and retirement 736, are illustrated on a GUI of a computing device. In addition, FIG. 8 illustrates both event types. Moving event 812, with a date of occurrence in August, is an example of a first event type; and the event of having a baby 810, with a start date in April and an end date in December, is an example of a second event type.

GUI generation module 235 can generate one or more GUI screens that allow for interaction with a user. In at least one embodiment, GUI generation module 235 generates a graphical user interface receiving and/or conveying information (e.g., as provided by recommendation module 245) to the user. In some embodiments, GUI generation module 235 can provide user-selectable icons (e.g., corresponding to various life events) on a GUI for a user to enter event information. In some embodiments, GUI generation module 235 can generate a second GUI on the screen of a computing device in response to detecting a user selecting a user-selectable icon on a first GUI.

Figure 9:
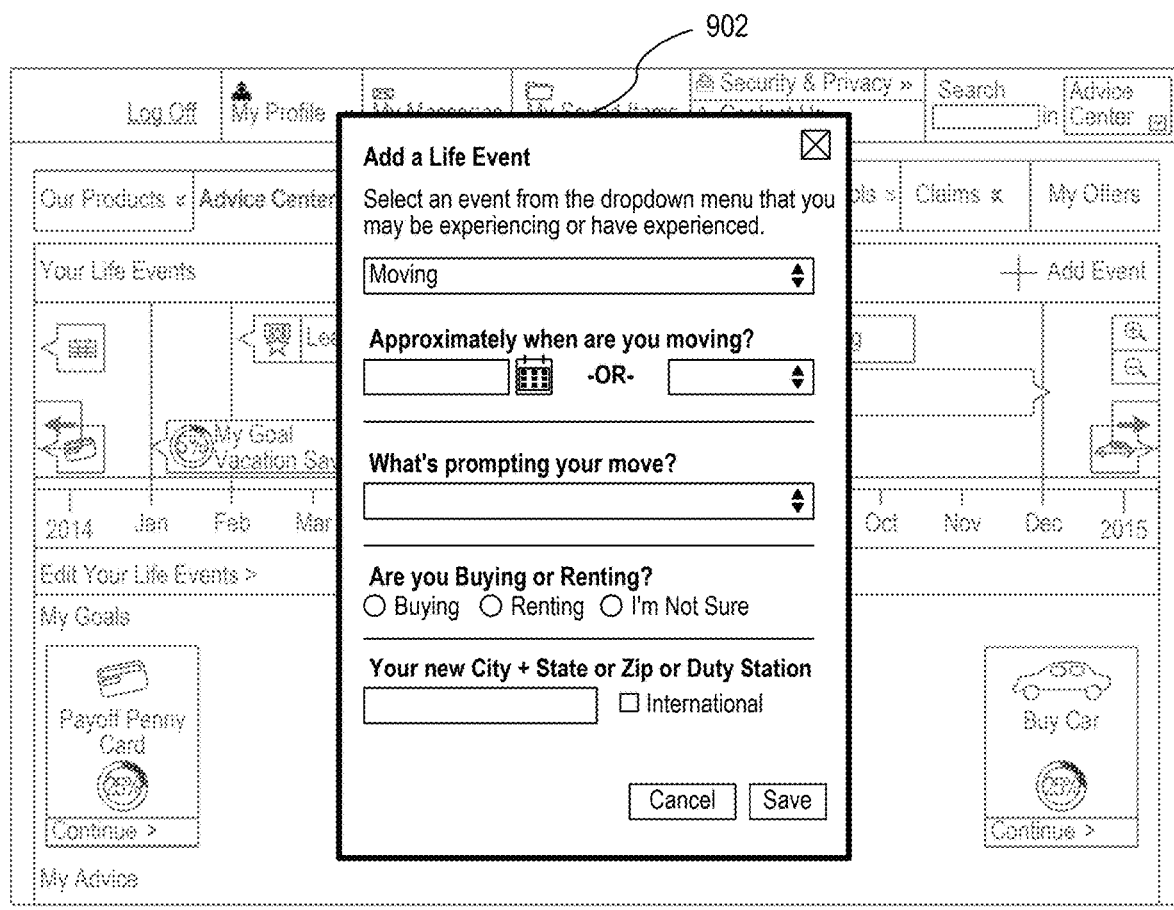
Figure 10:
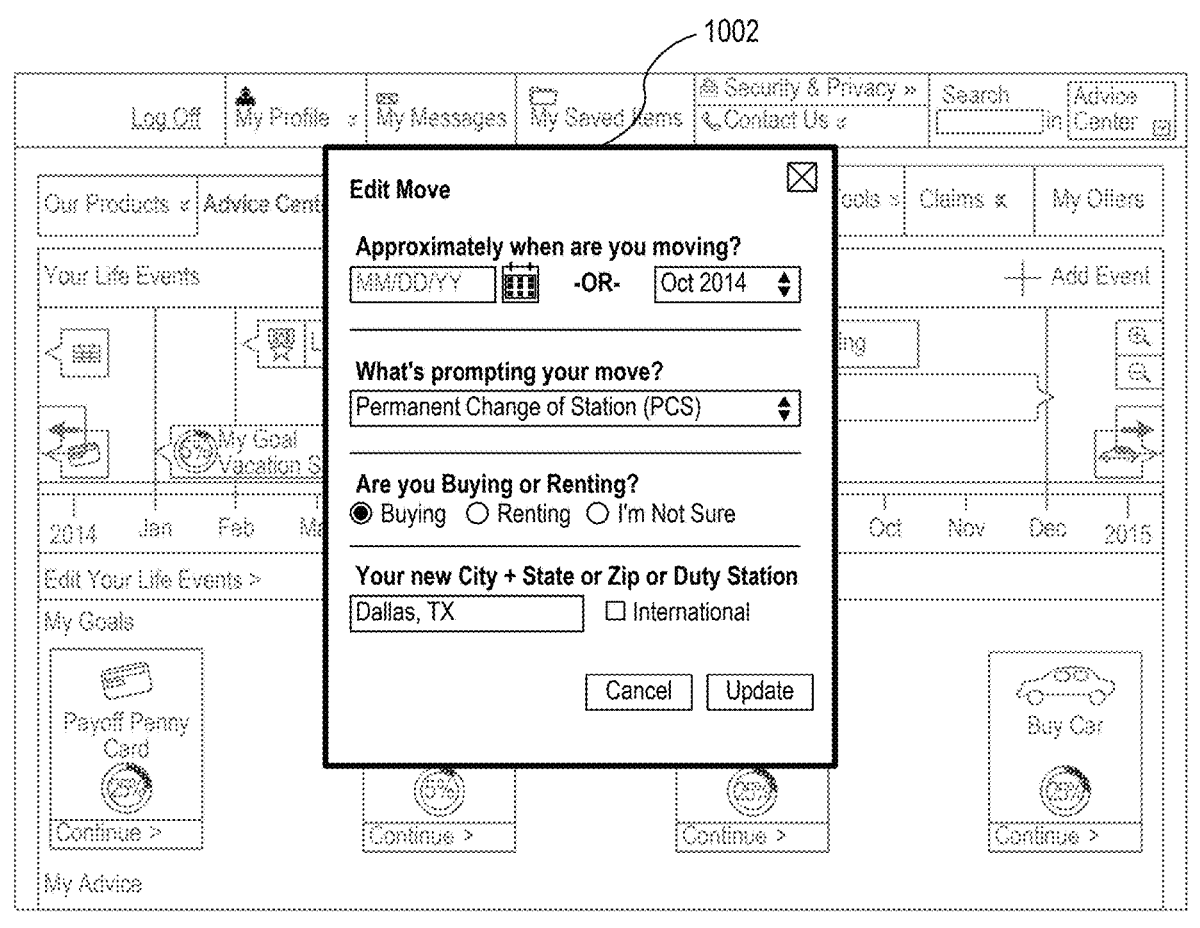

Moreover, in some embodiments, the second GUI can be superimposed on the first GUI. An example of a first GUI 800 is shown in FIG. 8. When a user clicks on the Add Event button 818 on this GUI, a second GUI 902, shown in FIG. 9, is superimposed on first GUI 800. The second GUI 902 can have several user-interface controls and options to add information. For example, the second GUI 902 shows a drop-down menu for a moving event with additional questions such as an approximate date of moving, reasons for moving, whether the user is buying or renting the new residence, the address of the new residence, etc. A user can enter information (e.g., as shown in screen 1002 in FIG. 10 corresponding to the moving event).

Timeline generation module 240 can generate timelines on one or more GUI screens that allow for interaction with a user. The timeline can show events in the user's life on certain dates or spanning certain dates. In some embodiments, the timeline may illustrate a user's predicted financial well-being (e.g., net worth, cash flow, credit score, other financial score) over time as events occur. Time may be represented by a horizontal axis, while an indication of the user's financial well-being can be represented on a vertical axis. Timeline generation module 240 may illustrate the impact of events on a user's finances by lowering or raising the user's predicted financial well-being.

Events may be received from event module 230 (e.g., a wedding, a predicted need to purchase a new furnace, a rise in salary) and indicated on the timeline as a point in time (or spanning several points in time) and can impact the user's financial well-being. In this way, the timeline changes with the events of the user's life. In some scenarios, if a user purchases new insurance, or life events cause changes to an existing insurance policy of the user, such new purchases or changes to insurance policies are displayed on the timeline.

The timeline generation module 240 may generate timelines that a user can interact with by scrolling, pinching, zooming in, zooming out, etc. on a portion of a displayed timeline. The timeline generation module 240 can display visual indicia corresponding to events on a graphical user interface (e.g., a bubble, dot, mark, line, pin, horizontal bars, etc.). The visual indicia define positions of events with respect to a timeline displayed on the graphical user interface. As discussed above, a received event can be classified as a first event type (i.e., event associated with a point in time) or a second event type (i.e., event spanning two or more points in time).

When events are added to the timeline, new recommendations can be made. Adding events to the timeline can automatically relocate the position of other events on the timeline with respect to time so that the events are displayed in the same GUI window. In some embodiments, when an event is added to the timeline, the event may change a location of a second event such that the second event shifts dates on the timeline. Additionally, when an event is added to the timeline, existing event indications may be shifted upward or downward on the timeline to correspond with monetary changes that may occur with the addition of the event.

In some embodiments, after an event is added, recommendations from recommendation module 245 may propose shifting events forward or backward in time to account for the change in a financial situation. For example, if the user indicates, or the system otherwise detects, that a new vehicle will be needed in the next six months, recommendation module 245 may recommend that a vacation event be moved past the six-month mark to ensure that the user will have enough money to afford the vehicle. The various recommended scenarios can be displayed on the timeline with the events shifting positions to change the financial outlook.

In some embodiments, timeline generation module 240 can display a first timeline that does not include a recommended financial plan and a second timeline that does include a recommended financial plan (i.e., two financial plans are shown on the timeline: the original financial plan and the recommended financial plan). In some embodiments, the first and second timelines can be displayed on the same interface showing the difference if the user takes a recommended course of action. In at least one embodiment, timeline generation module 240 generates a graphical user interface for receiving and/or conveying information to the user.

In some embodiments, timeline generation module 240 can generate a timeline that includes previous and/or future dates, using actual data for the previous dates. Such a timeline can also include indications of past events, allowing the user to see the actual impact of these events on the user's finances. In some embodiments, the user's actual past financial well-being and the prediction of the user's financial well-being over the same time period may be displayed simultaneously on the same graph.

Figure 12:
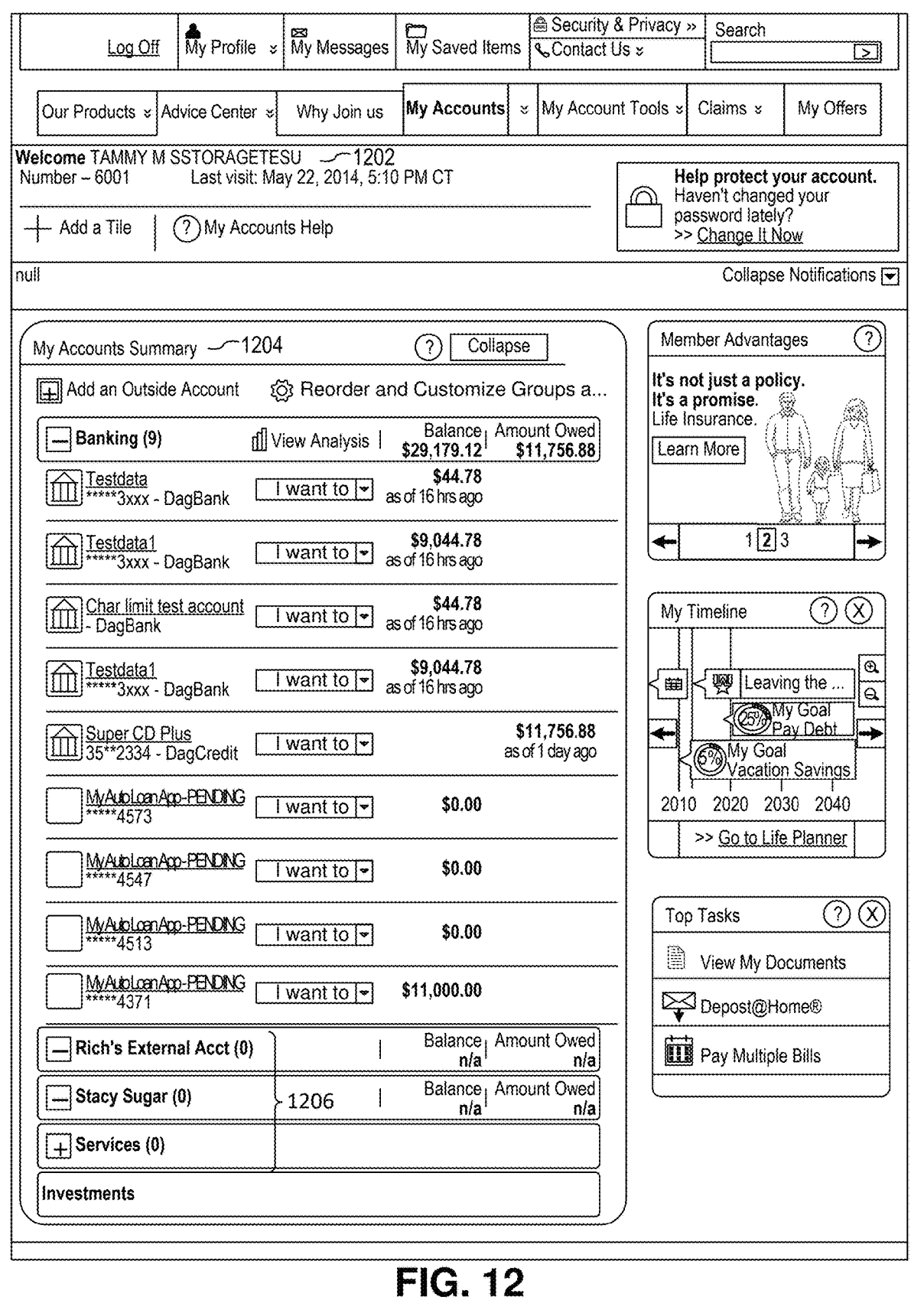

In some embodiments, events can be marked as partially completed or as scheduled to take place in the future. For example, a vacation savings event in which a user is saving money to go on a vacation can be an event that extends over time. After the user starts saving money, but before he or she reaches the goal, the event can be recorded as partially complete. In such embodiments, timeline generation module 240 can communicate with a user's financial institution or bank (via the third-party module 225) to determine an amount of money that the user has saved to date. An example of a user's financial summary received from a user's bank or financial institution by third-party data module 225 is shown in region 1204 in FIG. 12. In this example, a user Tammy M S Storagetesu (indicated in region 1202) has enlisted one or more financial accounts (shown in region 1206) with life planning platform 120. These financial accounts are continuously monitored and scraped by life planning platform 120 to determine the finances of Ms. Storagetesu.

In another scenario, the event may be a credit card debt payoff event (e.g., dates over which the user wishes to pay off his or her credit card debt). Thus, such an event can be partially complete and timeline generation module 240 can calculate a percentage of completion of the credit card debt payoff event. In some embodiments, this percentage is displayed on a GUI with the help of an indicator such as a circular dial. The dial can be shaded or colored and can also display a number showing the percentage of completion of the event. Events 720, 722, 724, and 726 illustrated in FIG. 7 are examples of events that show a percentage of completion. In some embodiments, indicators corresponding to these events can be superimposed on the timeline, as shown by example indicators 822 and 824 that are superimposed on timeline 820 in FIG. 8. Thus, for example, indicator 822 displays that a vacation savings goal is currently 5% complete, and indicator 824 indicates that a pay debt goal is currently 25% complete.

Recommendation module 245 generates recommendations and predictions pertaining to events. For example, if the event is paying off a credit card, recommendation module 245 can recommend paying off the credit card with a different credit card if the interest rate on the second credit card is lower than the first credit card. Recommendation module 245 can also generate a recommended financial plan for the user based on his or her expenses and income upon considering the financial impact of the user's life events. The recommendation module 245 can communicate, for instance, with profile module 215, third-party data module 225, and event module 230 to generate recommendations and predictions.

In some embodiments, the recommendations and predictions are generated using machine learning (e.g., using methodologies such as artificial neural networks, support vector machines, and Naive Bayes classifiers) on the event data, where the events can include life events. That is, the system generates an initial set of recommendations and predictions based on an initial data set (e.g., training data). The initial set of recommendations and predictions is updated as more data is collected. In some embodiments, recommendation module 245 uses Monte Carlo simulation methodologies to generate recommendations for the user based on life event data for the user, such data being received from the user, third parties (banks, financial institutions, social media networks, etc.) or a combination thereof.

Recommendation module 245 may provide recommendations as to how to meet the user's financial goals or to ensure that bills are paid. For example, if event module 230 communicates that the user is preparing to have a baby in the next six months, recommendation module 245 can recommend one or more actions or financial plans to save for the expenses incurred in connection with the newborn. Some of the recommendations may include moving a first event such as going on vacation, purchasing a home, or paying off credit cards to ensure that there will be enough money to pay for the additional expenses associated with the baby. Recommendation module 245 may further provide recommendations as to how to spend/save to retire on a certain date, the order in which to pay off credit card debt, when to purchase a home and what type of loan to incur, when to begin purchasing items in preparation for having a child, things to do when leaving the military or armed forces, how to save for retirement, and various other plans or goals that a user may have. Recommendation module 245 can provide the recommendations to life planning platform 120. In some embodiments, life planning platform 120 can invoke the help of a financial planner or advisor for providing recommendations (in lieu of or in addition to the recommendations by recommendation module 245) after timeline generation module 240 generates a timeline of events for a user.

Figure 13:
FIGS. 13-19 illustrate example GUIs depicting products and processes associated with creating a timeline and life event in accordance with various embodiments of the present disclosure.
Figure 13:
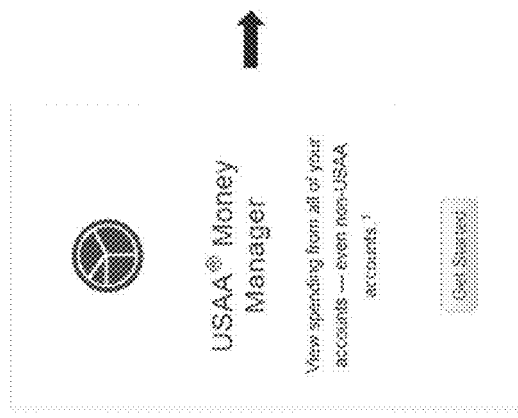
Figure 13:
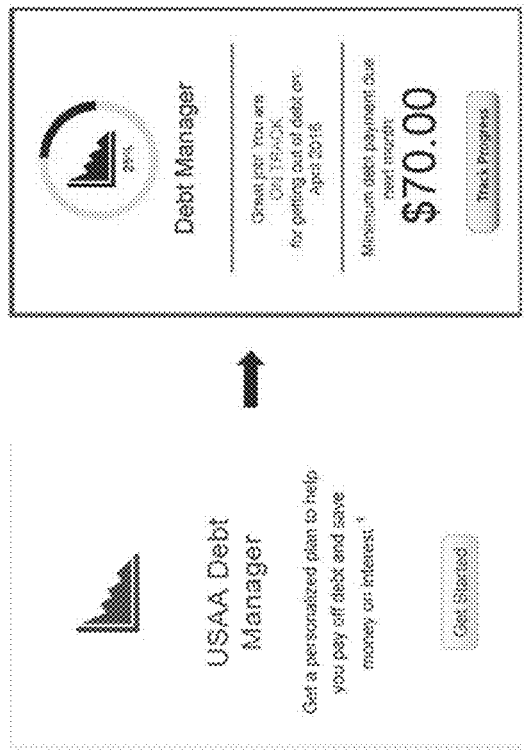
Figure 14:
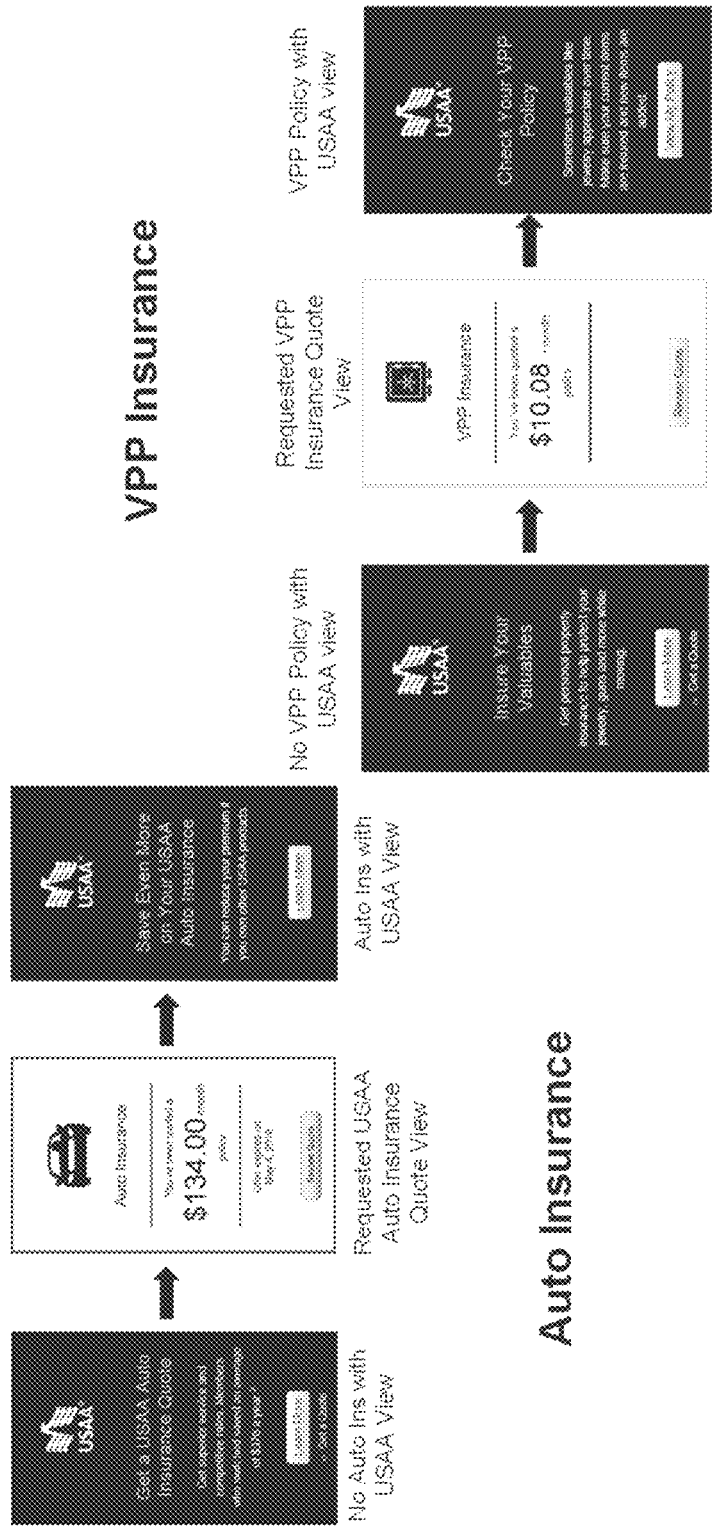

Advice module 250 can receive profile information from profile module 215, including topics that are of interest to the user and provide advice on those topics. For example, if the user selected "debt and credit" as a topic of interest, the user may be offered a personalized plan to help the user pay off debt and save money on interest. As shown in FIG. 13, once the user chooses to accept the plan, advice module 250 can track the user's progress and present updates (e.g., "You are on track for getting out of debt by April of next year. The minimum debt payment due next month is $70.00"). In another example also shown in FIG. 13, a money manager tool can be presented to the user offering the user a tool to view spending from all the user's account. If the user chooses to view the money manager, the user can be provided an assessment of the user's spending (e.g., "You have spent $3000 of $5000 this month. Great job! You are on budget with 8 days left in January"). Advice module 250 can further provide various advertisements and advice based on the user's current products or suggested products, such as those shown in FIG. 14.

Figure 15:
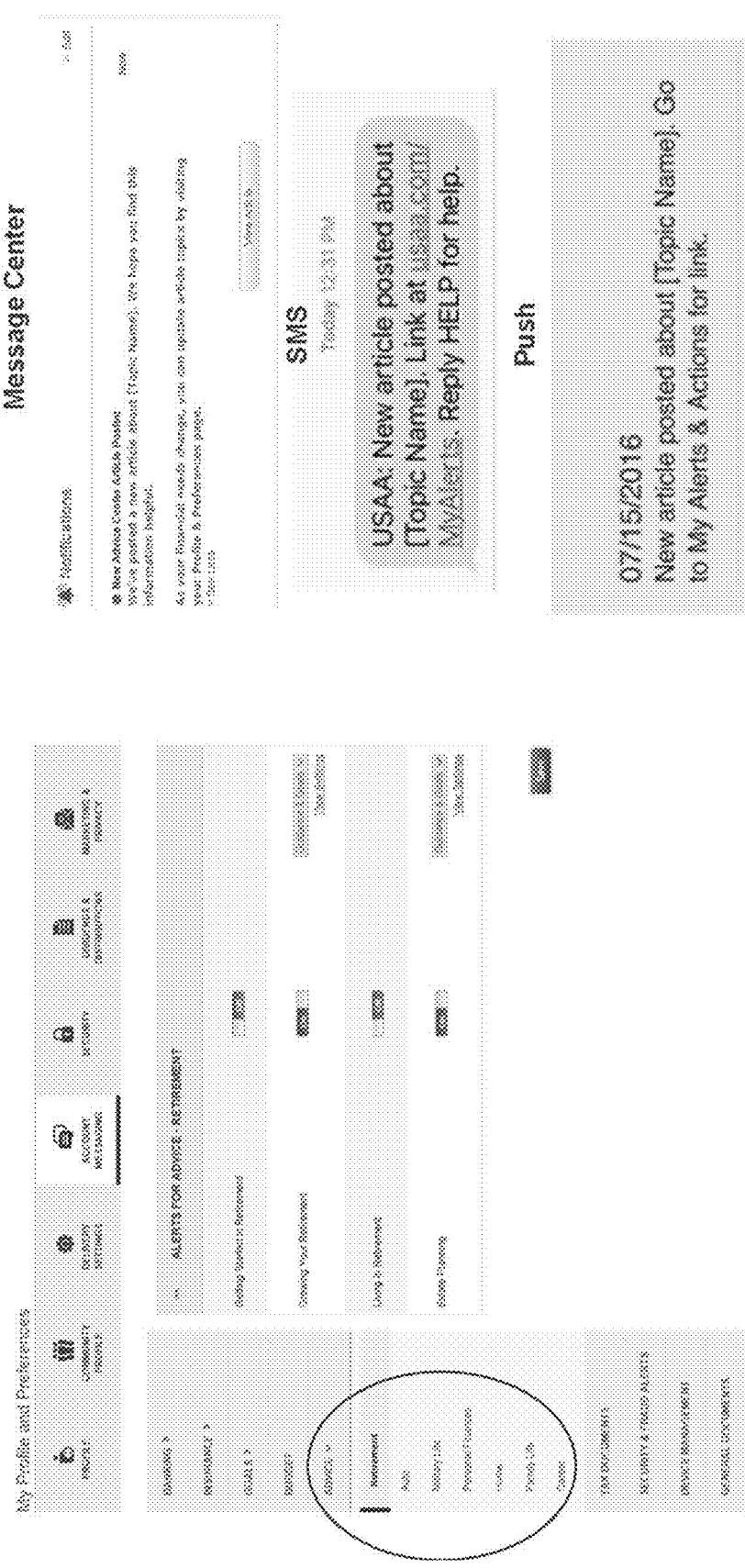
Figure 16:
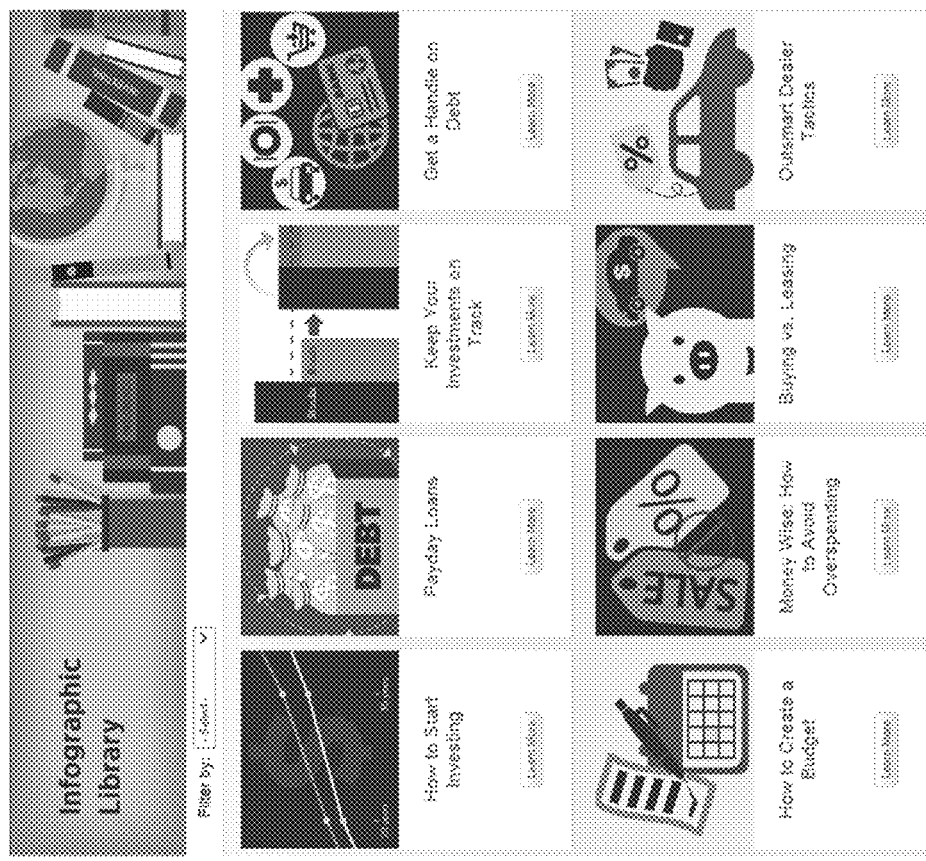
Figure 17:
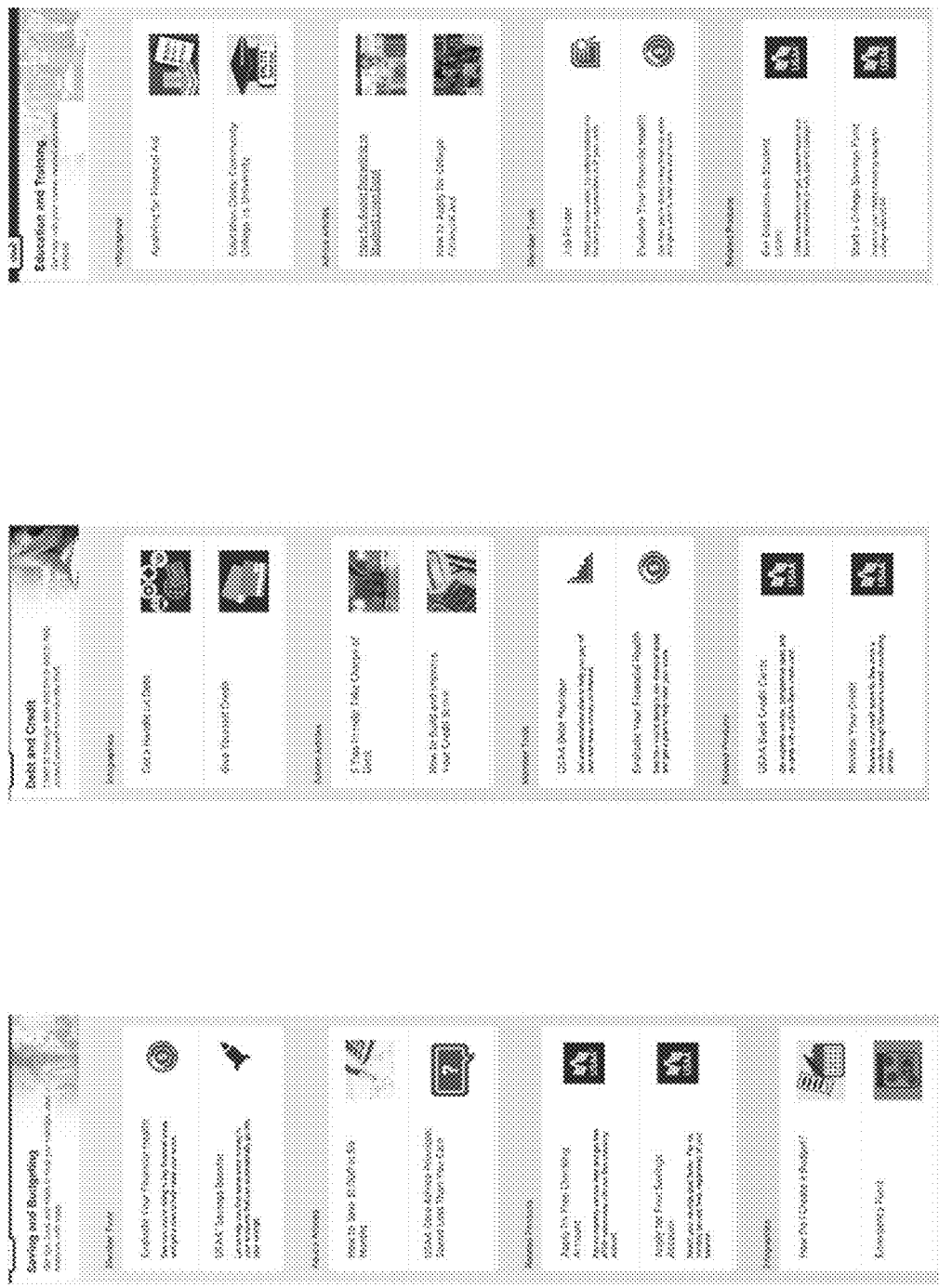
Figure 18:
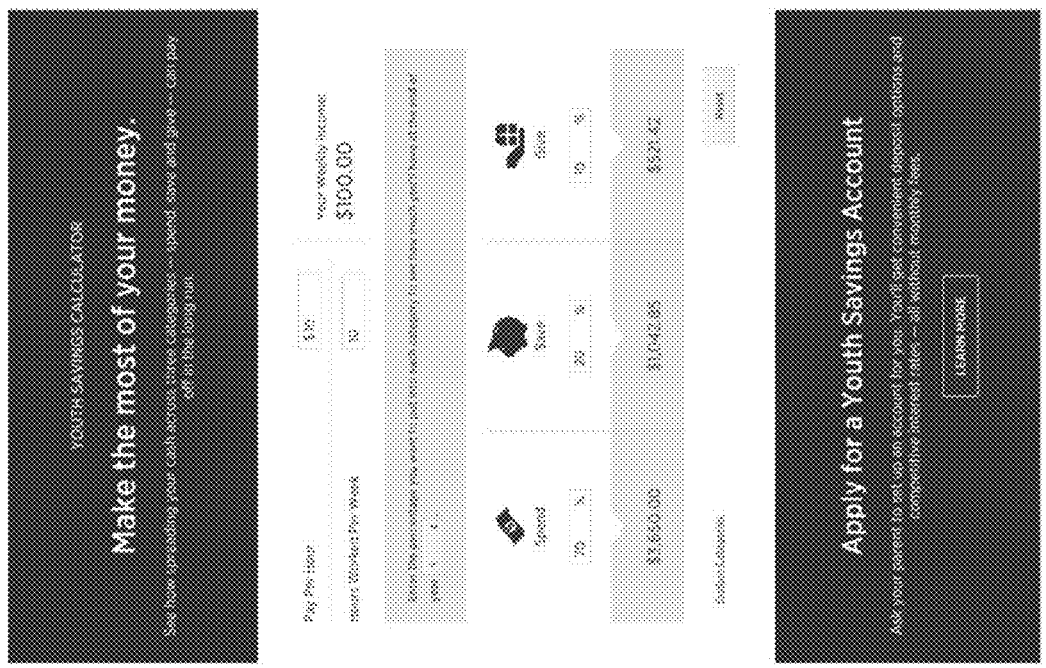

Advice module 250 can further provide notifications and alerts regarding topics the user has selected. As FIG. 15 shows, the user can select whether to receive such notifications on a per topic basis. The messages may be sent via push notification, text message, or via an account of the user. Advice module 250 can provide a library of digital infographics based on the user's topic preferences, as shown in FIG. 16. The user can learn more about each topic by selecting the "learn more" button. Advice module 250 can provide new mobile advices pages with various tools for the user based on the user's interests, as shown in FIG. 17. For example, if the user chooses "savings and budgeting" as a topic of choice, the mobile advice page within a mobile application can offer to evaluate the user's financial health, determine where the user could save additional money, provide specific advice such as how to save $1000 in six months and core principles, provide advertisements for products related to the topic, and provide infographics to topics of interest such as how to create a budget and an emergency fund. Advice module 250 can provide a youth savings calculator that assists with allocating funds and providing a visual reference for young people, as shown in FIG. 18.

Thus, in some embodiments of the present disclosure, life planning platform 120 generates a financial plan and/or outlook for a user. Life planning platform 120, for example, performs the computations and manipulations (e.g., probabilistic inferences) that can be used to display a timeline. The timeline provides a prediction of the financial well-being of a user over time. The financial well-being of a user can, for example, be represented by the user's net worth, cash flow, and financial readiness score. In some embodiments, the timeline (generally indicated as a display on a GUI) can be parsed to generate data in one or more readable and sharable formats (e.g., as a CSV file that can be shared with a financial planner). Thus, embodiments disclosed herein facilitate parsing a timeline to generate data that can be optionally shared with various individuals and entities. In some aspects, a timeline of a user is representative of a "financial profile" of the user.

Life planning platform 120 communicates with other modules to perform the task of financial planning. Life planning platform 120 processes the existing data for the user (e.g., income, expenses), the event data (e.g., having a baby, getting married, going on vacation), and other financial data (e.g., raises in salary, inheritance, vacations) to generate the predicted timeline for the user. In some embodiments, life planning platform 120 uses information from those similarly situated (e.g., financial, age, familial status) in combination with the user's data to generate the predicted timeline. Computation of the financial well-being of a user can involve communication with third-party data module 225. Recommendation module 245 may recommend changes that impact the timeline. Life planning platform 120 can factor the recommendations into the timeline so the user can see the potential impact on the user's finances should the recommendation be taken.

In some embodiments, the life planning platform 120 automatically continues to generate a user's timeline without any form of input from a user. For example, even if a user does not log in to the life planning platform 120 for some time, life planning platform 120 can work behind the scenes to continuously update the timeline of a user.

Figure 3:
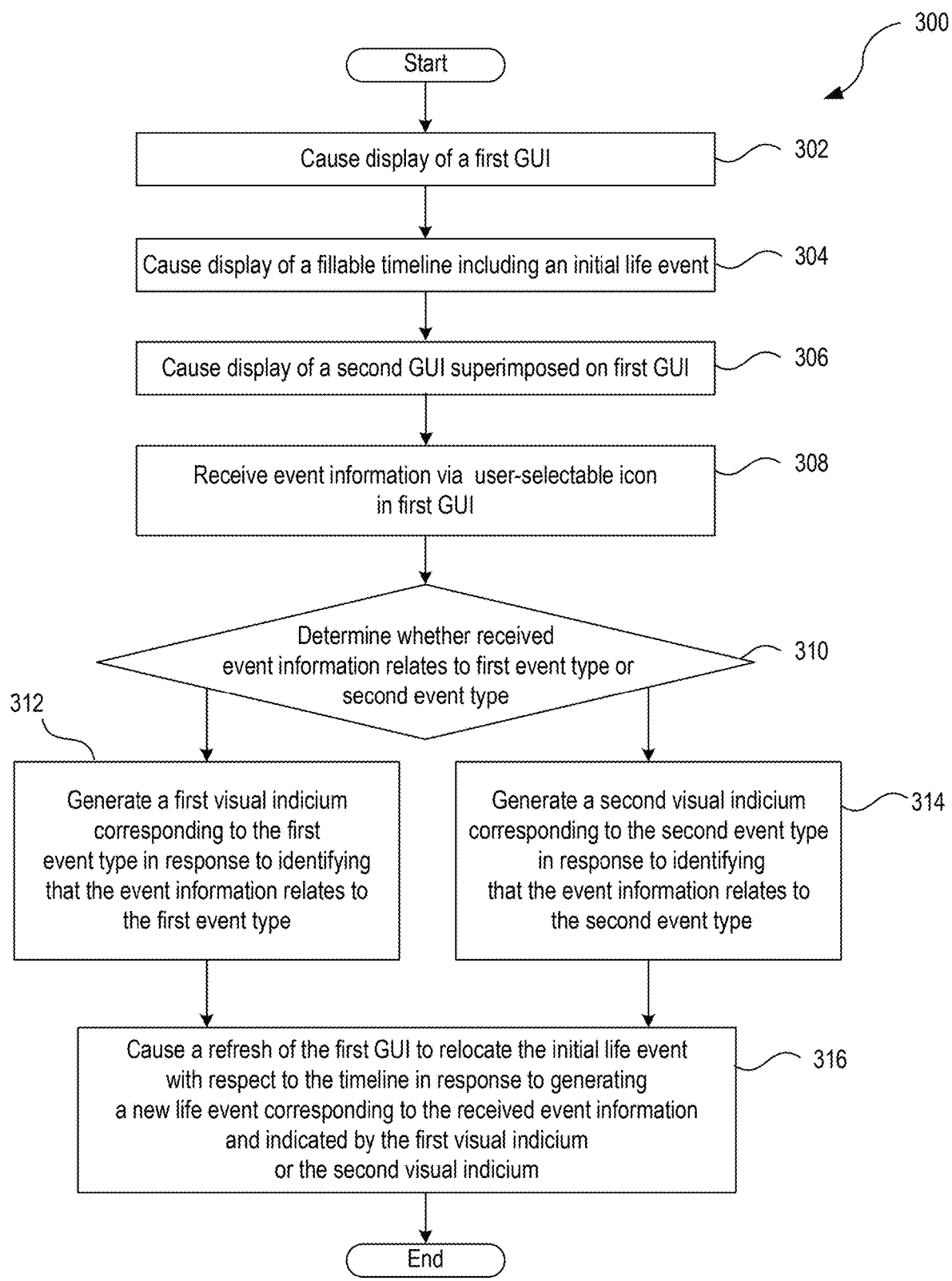
FIG. 3 is a flowchart illustrating a set of operations for developing a timeline in accordance with various embodiments of the present disclosure.
Figure 4:
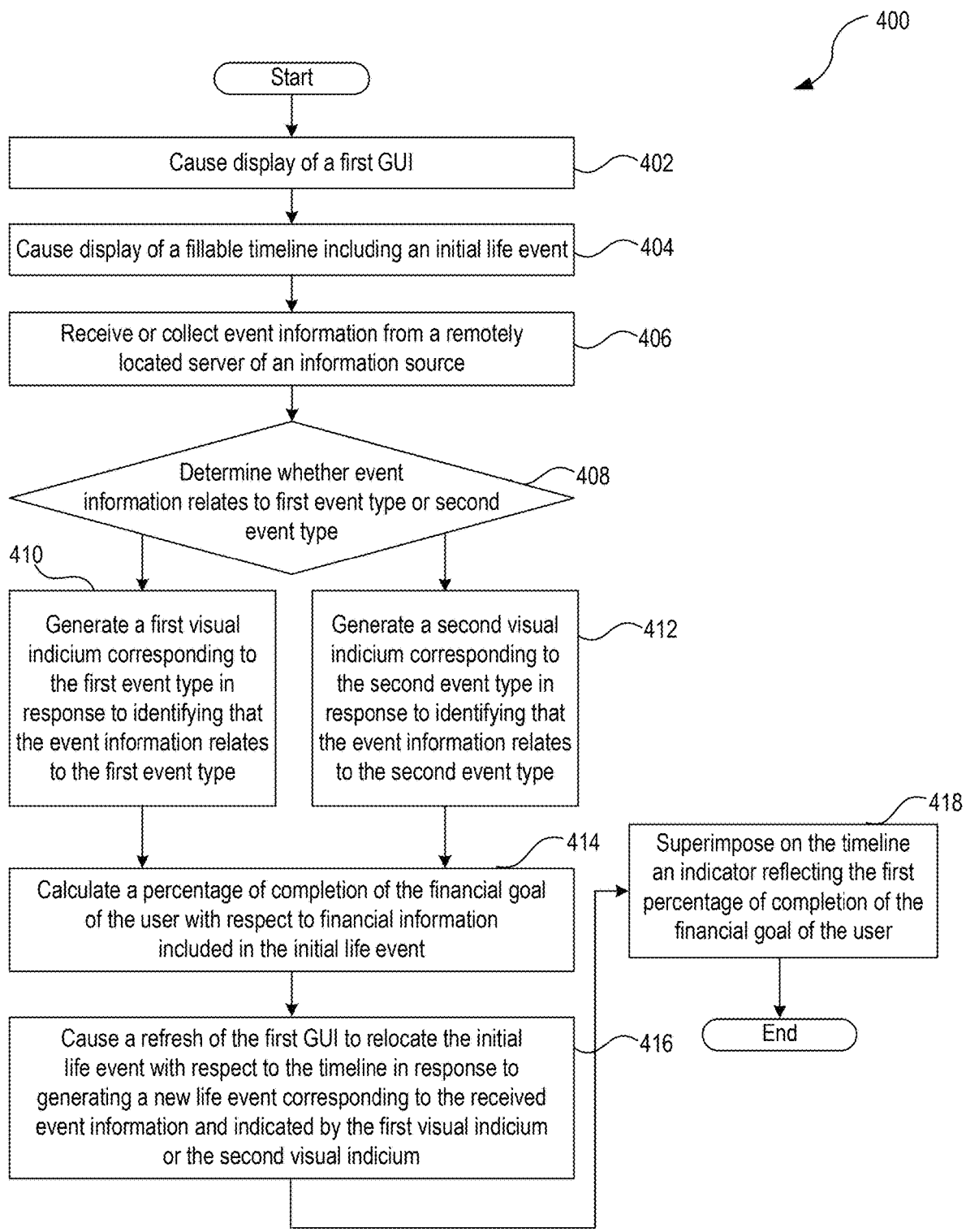
FIG. 4 is a flowchart illustrating a set of operations for developing a timeline in accordance with various embodiments of the present disclosure.
Figure 5:
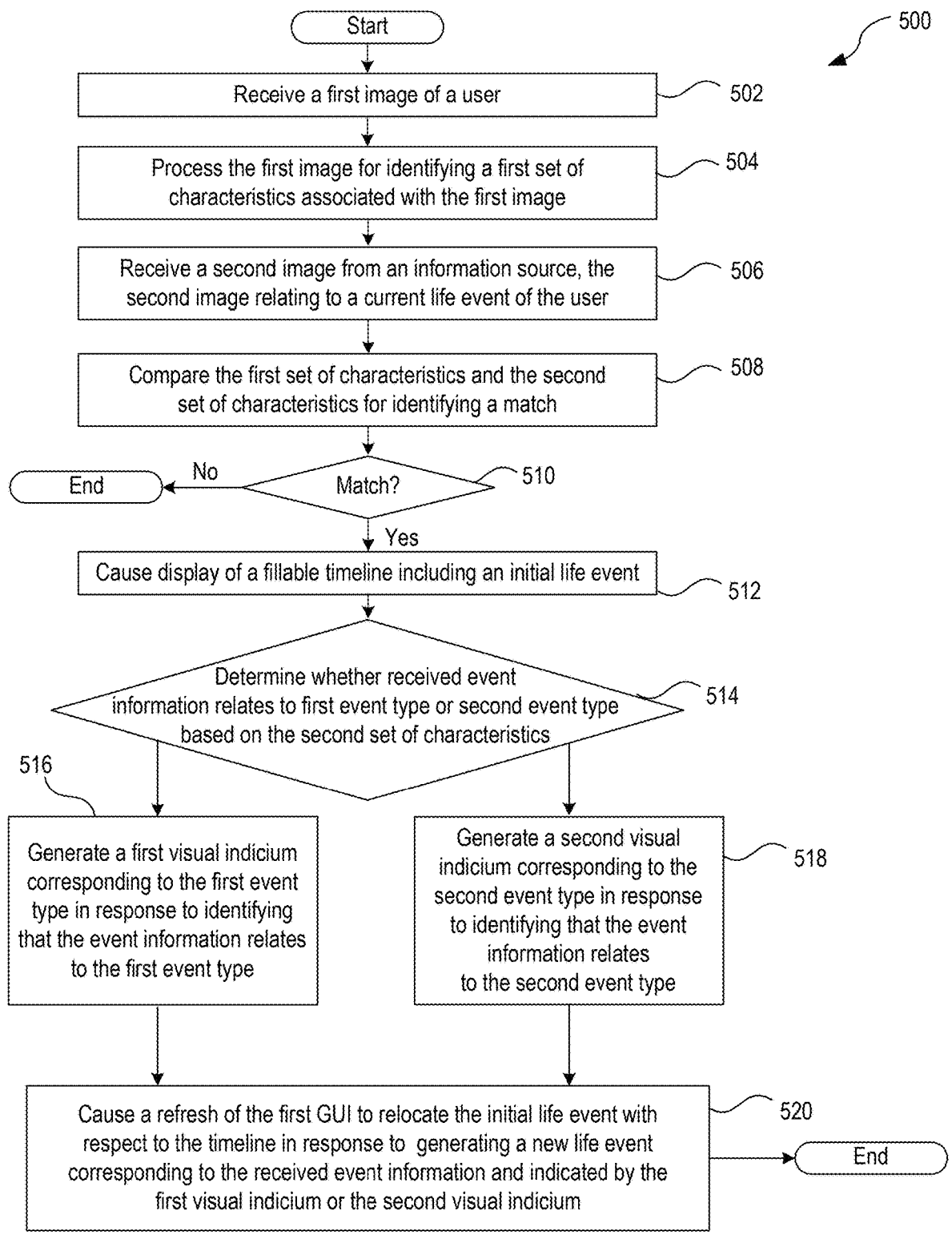
FIG. 5 is a flowchart illustrating a set of operations for developing a timeline in accordance with various embodiments of the present disclosure.

FIGS. 3-5 are flowcharts illustrating sets of operations for developing a timeline. In some embodiments, fewer than all of the operations in each set of operations may be performed, whereas in other embodiments additional operations may be performed. Moreover, in some embodiments, the operations may be performed in different orders or in parallel. The operations can be performed by various components of life planning platform 120 illustrated in FIG. 2.

FIG. 3 is a flowchart illustrating a set of operations 300 for developing a timeline. Operation 302 causes a display of a first GUI on a screen of a computing device. The first GUI may include multiple user-selectable icons relating to life events. Operation 304 causes a display of a fillable timeline including an initial life event that is classified as a first event type or a second event type.

Operation 306 causes a display of a second GUI on the screen of the computing device. The second graphical user interface can be superimposed on the first graphical user interface and can be caused to be displayed in response to the detection of a user selecting, from on the first GUI, a user-selectable icon in the user-selectable controls relating to the life events. Receive operation 308 receives event information via the user-selectable icon. Determine operation 310 determines whether the received event information relates to the first event type or the second event type based on time-related data in the received event information.

If the event information is identified as relating to the first event type, generate operation 312 generates a first visual indicium corresponding to the first event type. The first visual indicium defines a point of the event information located on the timeline (i.e., date of occurrence). However, if the event information is identified as relating to the second event type, generate operation 314 generates a second visual indicium corresponding to the second event type, wherein the second visual indicium defines a horizontal segment of the event information located on the timeline. The horizontal segment can include a start date of occurrence and an end date of occurrence of the event in the event information that spans more than a single date. Refresh operation 316 causes an automatic refresh of the first GUI to relocate the initial life event with respect to the timeline in response to the generation of a new life event corresponding to the received event information and indicated by the first visual indicium or the second visual indicium. The relocation of the initial life event may relocate the initial life event to different dates and/or to a different position in the window so that all events are visible. The process terminates thereafter.

FIG. 4 is a flowchart illustrating a set of operations 400 for developing a timeline, in accordance with various embodiments of the disclosure. Operation 402 causes a display of a GUI on a screen of a computing device. Operation 404 causes a display of a fillable timeline including an initial life event that is classified as a first event type or a second event type.

Operation 406 receives or collects event information relating to a financial goal of the user from a remotely located server of an information source associated with the user. Determine operation 408 determines whether the received event information relates to the first event type or the second event type based on time-related data in the event information. In response to identifying that the event information relates to the first event type, generate operation 410 generates a first visual indicium corresponding to the first event type, where the first visual indicium defines a point of the event information located on the timeline (i.e., indicating a date of occurrence). However, if instead, it is identified that the event information relates to the second event type, generate operation 412 generates a second visual indicium corresponding to the second event type, wherein the second visual indicium defines a horizontal segment of the event information located on the timeline. The horizontal segment can include a start date of occurrence and an end date of occurrence.

Calculate operation 414 calculates a percentage of completion of the financial goal of the user with respect to financial information included in the initial life event. Refresh operation 416 causes an automatic refresh of the first GUI to relocate the initial life event with respect to the timeline in response to generating a new life event corresponding to the received event information and indicated by the first visual indicium or the second visual indicium. Superimpose operation 418 superimposes on the timeline an indicator reflecting the first percentage of completion of the financial goal of the user, and the percentage may be updated over time. The process terminates thereafter.

FIG. 5 illustrates a set of operations 500 for developing a timeline in accordance with various embodiments of the disclosure. Operation 502 receives a first image of a user during a registration process. Process operation 504 processes the first image for identifying a first set of characteristics associated with the user. Receive operation 506 receives a second image from an information source that relates to a current life event of the user. Compare operation 508 compares the first set of characteristics and the second set of characteristics for identifying a match. Decision operation 510 determines whether there is a match between the first and second set of characteristics.

Operation 512 causes display of a fillable timeline including an initial life event that is classified as a first event type or a second event type. Determine operation 514 determines whether the received event information relates to the first event type or the second event type based on the second set of characteristics. If the received event information relates to the first type of event, generate operation 516 generates a first visual indicium corresponding to a first event type. The first visual indicium defines a point of the event information located on the timeline indicating a date of occurrence. If the received event information relates to the second type of event, generate operation 518 generates a second visual indicium corresponding to the second event type, wherein the second visual indicium defines a horizontal segment of the event information located on the timeline. The horizontal segment includes a start date of occurrence and an end date of occurrence of the event in the event information. Refresh operation 520 causes an automatic refresh of the first GUI to relocate the initial life event with respect to the timeline in response to generating a new life event corresponding to the received event information and indicated by the first visual indicium or the second visual indicium. When an event is added to the timeline, the event may change a location of a second event such that the second event shifts dates on the timeline and/or adjusts in the window so that all events are visible. The process terminates thereafter.

Figure 6:
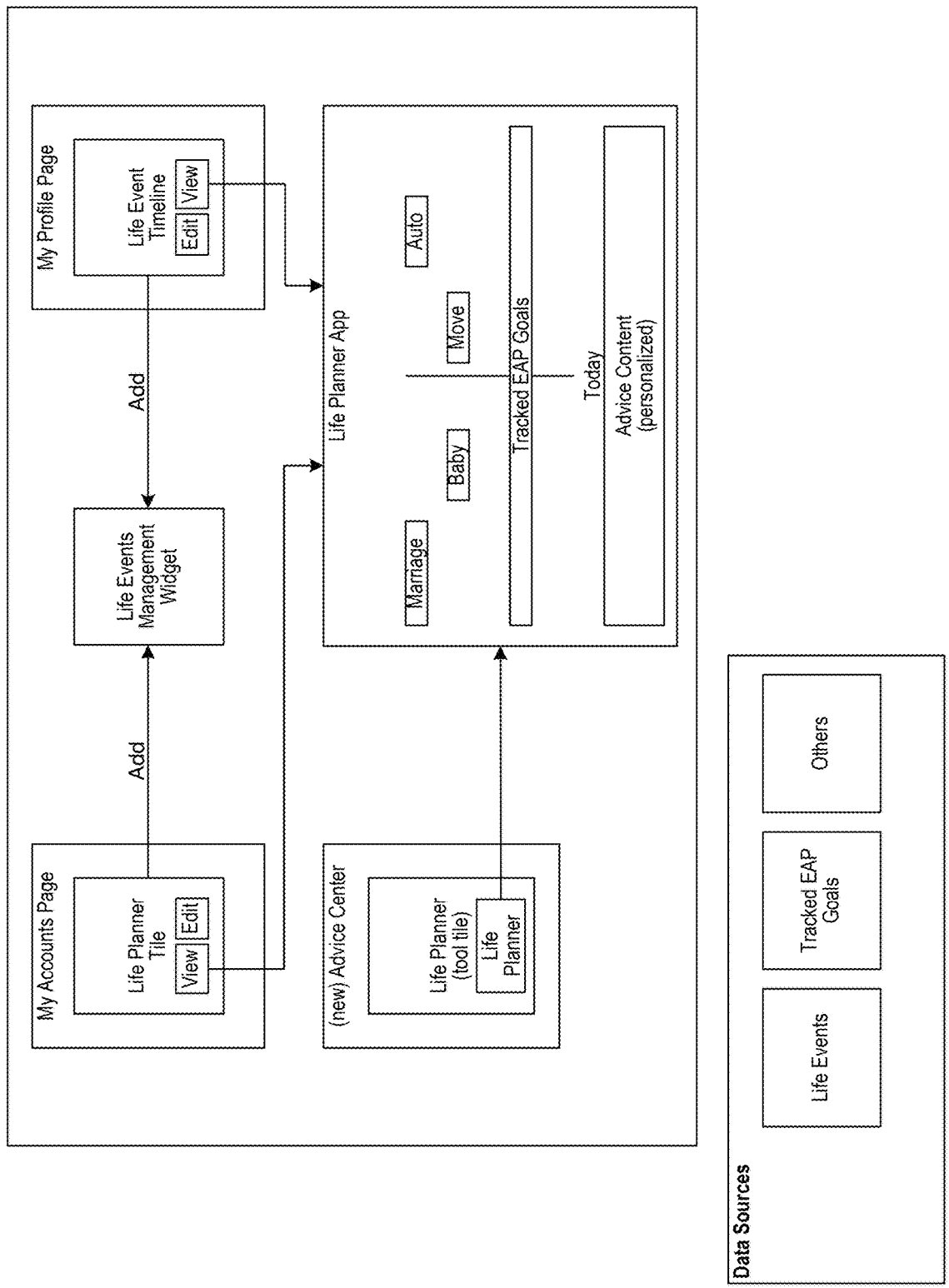
FIG. 6 illustrates an example of information flow among various graphical user interface ("GUI") elements developed in accordance with various embodiments of the present disclosure.

FIG. 6 is a schematic of information flow among various graphical user interface elements of life planning platform 120 developed in accordance with various embodiments of the disclosure. As shown in FIG. 6, a user can add events to a Life Events Management Widget via the Life Planner Tile on a My Accounts Page or a Life Event Timeline on a My Profile Page. The Life Planner App can receive information from the Life Planner Tile and the Life Event Timeline. Examples of events that can be configured for a user include marriage, baby, move, and auto (i.e., new vehicle purchase). The Life Planner App can also receive information from a Life Planner engine in the Advice Center (e.g., a recommendation module). FIG. 6 also displays data sources such as a Life Events data source, a Tracked EAP Goals data source, and another (auxiliary) data source.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps.

Figure 20:
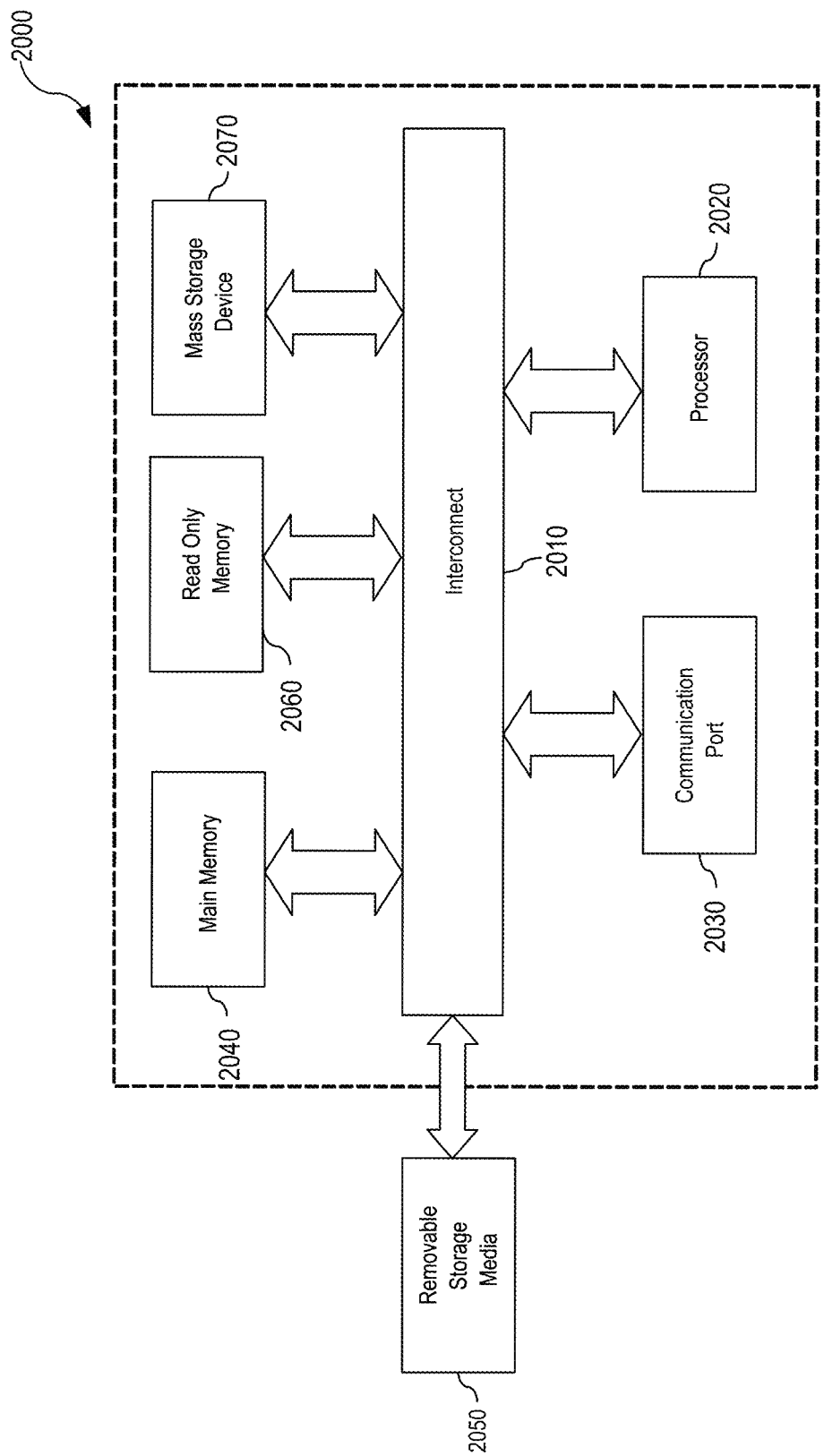
FIG. 20 illustrates an example of a computer system with which some embodiments of the present disclosure may be utilized.

Alternatively, the steps may be performed by a combination of hardware, software, and/or firmware. As such, FIG. 20 is an example of a computer system 2000 with which embodiments of the present disclosure may be utilized. According to the present example, the computer system 2000 includes an interconnect 2010, at least one processor 2020, at least one communication port 2030, main memory 2040, one or more removable storage media 2050, read-only memory 2060, and a mass storage device 2070.

Processor(s) 2020 can be any known processor, such as, but not limited to, Intel® Itanium® or Itanium 2® processors, or AMD® Opteron® or Athlon MP® processors, or Motorola® lines of processors. Communication port(s) 2030 can be any of an RS-232 port for use with a modem-based dial-up connection, a 10/100 Ethernet port, or a Gigabit port using copper or fiber. Communication port(s) 2030 may be chosen depending on a network such as a local area network (LAN), wide area network (WAN), or any network to which the computer system 2000 connects.

Main memory 2040 can be random access memory (RAM) or any other dynamic storage device commonly known in the art. Read-only memory 2060 can be any static storage device, such as programmable read-only memory (PROM) chips, for storing static information such as instructions for processor 2020.

Mass storage device 2070 can be used to store information and instructions. For example, hard disks such as the Adaptec® family of SCSI drives, an optical disc, an array of disks such as RAID, the Adaptec family of RAID drives, or any other mass storage devices may be used.

Interconnect 2010 communicatively couples processor(s) 2020 with the other memory, storage, and communication blocks. Interconnect 2010 can be a PCI/PCI-X- or SCSI-based system bus, depending on the storage devices used.

Removable storage media 2050 can be any kind of external hard-drives, floppy drives, IOMEGA® zip drives, compact disc read-only memory (CD-ROM), compact disc rewritable (CD-RW), or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic under discussion is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input. A module may or may not be self-contained. An application program (also called an "application") may include one or more modules, or a module may include one or more application programs.

The term "network" generally refers to a group of interconnected devices capable of exchanging information. A network may be as small as several personal computers on a local area network or as large as the Internet, a worldwide network of computers. As used herein, "network" is intended to encompass any network capable of transmitting information from one entity to another. In some cases, a network may comprise multiple networks, even multiple heterogeneous networks, such as one or more border networks, voice networks, broadband networks, financial networks, service provider networks, Internet service provider (ISP) networks, and/or public switched telephone networks (PSTNs) interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for developing an automated life planner. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
training a machine learning model comprising at least one of A) an artificial neural network, B) a support vector machine, or C) a Naïve Bayes classifier, by applying an initial set of training data comprising a set of event information to the machine learning model;
causing display of a first graphical user interface on a screen of a computing device, the first graphical user interface including a plurality of user-selectable icons relating to events and causing display of a timeline including an initial event that is classified as a first event type or a second event type;
in response to detecting a user selecting a user-selectable icon in the plurality of user-selectable icons relating to the events, superimposing a second graphical user interface on the first graphical user interface;
displaying the second graphical user interface on the screen of the computing device;
in response to receiving at least one image from at least one external source, processing the at least one image to extract one or more characteristics identifying event information;

determining, by the machine learning model, whether the event information relates to the first event type or the second event type based on time-related data in the event information;

in response to identifying that the event information relates to the first event type, generating a first visual indicium corresponding to the first event type, wherein the first visual indicium defines a point of the event information located on the timeline, the point indicating a date of occurrence;

in response to identifying that the event information relates to the second event type, generating a second visual indicium corresponding to the second event type, wherein the second visual indicium defines a horizontal segment of the event information located on the timeline, the horizontal segment including a start date of occurrence and an end date of occurrence;

using the machine learning model to control the first graphical user interface by:
 automatically moving an event icon of the initial event along the timeline of the first graphical user interface in response to generating a modified event corresponding to the event information and indicated by the first visual indicium or the second visual indicium,
 displaying an edit goal icon in the first graphical user interface linked to the modified event, wherein the edit goal icon is selectable by the user to edit one or more goal settings to update the modified event; and
 re-training the machine learning model with the modified event corresponding to the event information and indicated by the first visual indicium or the second visual indicium; and
 using the re-trained machine learning model to automatically move the event icon along the timeline based on new event predictions from the re-trained the machine learning model.

2. The computer-implemented method of claim 1, further comprising:
 generating financial information including one or more recommendations based on a position of the initial event with respect to the timeline displayed on the first graphical user interface.

3. The computer-implemented method of claim 1, further comprising:
 generating financial information including one or more recommendations based on a relocated position of the initial event with respect to the timeline displayed on the first graphical user interface.

4. The computer-implemented method of claim 1, further comprising:
 querying a database for information relating to the initial event.

5. The computer-implemented method of claim 1, further comprising:
 automatically causing a refresh of the timeline in response to detecting information relating to another event of the user.

6. The computer-implemented method of claim 1, wherein the initial event includes at least one of: financial planning information of the user, health insurance information of the user, personal life information of the user, family life information of the user, or professional life information of the user.

7. The computer-implemented method of claim 1,
wherein the timeline is drawn horizontally and the first visual indicium is a marker icon pinned on the timeline, and
wherein the timeline is drawn horizontally and the second visual indicium is a horizontal bar spanning a portion of the timeline, a length of the horizontal bar proportional to a difference between the start date of occurrence and the end date of occurrence.

8. A system comprising:
one or more processors; and
one or more memories storing instructions that, when executed by the one or more processors, cause the system to perform a process comprising:
 training a machine learning model comprising at least one of A) an artificial neural network, B) a support vector machine, or C) a Naïve Bayes classifier, by applying an initial set of training data comprising a set of event information to the machine learning model;
 causing display of a first graphical user interface on a screen of a computing device, the first graphical user interface including a plurality of user-selectable icons relating to events and causing display of a timeline including an initial event that is classified as a first event type or a second event type;
 in response to detecting a user selecting a user-selectable icon in the plurality of user-selectable icons relating to the events, superimposing a second graphical user interface on the first graphical user interface;
 displaying the second graphical user interface on the screen of the computing device;
 in response to receiving at least one image from at least one external source, processing the at least one image to extract one or more characteristics identifying event information;
 determining, by the machine learning model, whether the event information relates to the first event type or the second event type based on time-related data in the event information;
 in response to identifying that the event information relates to the first event type, generating a first visual indicium corresponding to the first event type, wherein the first visual indicium defines a point of the event information located on the timeline, the point indicating a date of occurrence;
 in response to identifying that the event information relates to the second event type, generating a second visual indicium corresponding to the second event type, wherein the second visual indicium defines a horizontal segment of the event information located on the timeline, the horizontal segment including a start date of occurrence and an end date of occurrence;
 using the machine learning model to control the first graphical user interface by:
  automatically moving an event icon of the initial event along the timeline of the first graphical user interface in response to generating a modified event corresponding to the event information and indicated by the first visual indicium or the second visual indicium,
  displaying an edit goal icon in the first graphical user interface linked to the modified event, wherein the edit goal icon is selectable by the user to edit one or more goal settings to update the modified event; and re-training the machine learning model with the modified event corresponding to the event information and indicated by the first visual indicium or the second visual indicium; and using the re-trained machine learning model to automatically move the event icon along the timeline based on new event predictions from the re-trained the machine learning model.

9. The system according to claim 8, wherein the process further comprises:

generating financial information including one or more recommendations based on a position of the initial event with respect to the timeline displayed on the first graphical user interface.

10. The system according to claim 8, wherein the process further comprises:

generating financial information including one or more recommendations based on a relocated position of the initial event with respect to the timeline displayed on the first graphical user interface.

11. The system according to claim 8, wherein the process further comprises:

querying a database for information relating to the initial event.

12. The system according to claim 8, wherein the process further comprises:

automatically causing a refresh of the timeline in response to detecting information relating to another event of the user.

13. The system according to claim 8, wherein the initial event includes at least one of: financial planning information of the user, health insurance information of the user, personal life information of the user, family life information of the user, or professional life information of the user.

14. The system according to claim 8, wherein the timeline is drawn horizontally and the first visual indicium is a marker icon pinned on the timeline, and wherein the timeline is drawn horizontally and the second visual indicium is a horizontal bar spanning a portion of the timeline, a length of the horizontal bar proportional to a difference between the start date of occurrence and the end date of occurrence.

15. A non-transitory computer-readable medium storing instructions that, when executed by a computing system, cause the computing system to perform operations comprising:

training a machine learning model comprising at least one of A) an artificial neural network, B) a support vector machine, or C) a Naïve Bayes classifier, by applying an initial set of training data comprising a set of event information to the machine learning model;

causing display of a first graphical user interface on a screen of a computing device, the first graphical user interface including a plurality of user-selectable icons relating to events and causing display of a timeline including an initial event that is classified as a first event type or a second event type;

in response to detecting a user selecting a user-selectable icon in the plurality of user-selectable icons relating to the events, superimposing a second graphical user interface on the first graphical user interface;

displaying the second graphical user interface on the screen of the computing device;

in response to receiving at least one image from at least one external source, processing the at least one image to extract one or more characteristics identifying event information;

determining, by the machine learning model, whether the event information relates to the first event type or the second event type based on time-related data in the event information;

in response to identifying that the event information relates to the first event type, generating a first visual indicium corresponding to the first event type, wherein the first visual indicium defines a point of the event information located on the timeline, the point indicating a date of occurrence;

in response to identifying that the event information relates to the second event type, generating a second visual indicium corresponding to the second event type, wherein the second visual indicium defines a horizontal segment of the event information located on the timeline, the horizontal segment including a start date of occurrence and an end date of occurrence;

using the machine learning model to control the first graphical user interface by:

automatically moving an event icon of the initial event along the timeline of the first graphical user interface in response to generating a modified event corresponding to the event information and indicated by the first visual indicium or the second visual indicium, displaying an edit goal icon in the first graphical user interface linked to the modified event, wherein the edit goal icon is selectable by the user to edit one or more goal settings to update the modified event; and re-training the machine learning model with the modified event corresponding to the event information and indicated by the first visual indicium or the second visual indicium; and using the re-trained machine learning model to automatically move the event icon along the timeline based on new event predictions from the re-trained the machine learning model.

16. The non-transitory computer-readable medium of claim 15, wherein the operations further comprise:

generating financial information including one or more recommendations based on a position of the initial event with respect to the timeline displayed on the first graphical user interface.

17. The non-transitory computer-readable medium of claim 15, wherein the operations further comprise:

generating financial information including one or more recommendations based on a relocated position of the initial event with respect to the timeline displayed on the first graphical user interface.

18. The non-transitory computer-readable medium of claim 15, wherein the operations further comprise:

querying a database for information relating to the initial event.

19. The non-transitory computer-readable medium of claim 15, wherein the operations further comprise:

automatically causing a refresh of the timeline in response to detecting information relating to another event of the user.

20. The non-transitory computer-readable medium of claim 15, wherein the timeline is drawn horizontally and the first visual indicium is a marker icon pinned on the timeline, and wherein the timeline is drawn horizontally and the second visual indicium is a horizontal bar spanning a portion of the timeline, a length of the horizontal bar proportional to a difference between the start date of occurrence and the end date of occurrence.

* * * * *